(12) United States Patent
Jovanovic et al.

(10) Patent No.: US 11,164,387 B2
(45) Date of Patent: *Nov. 2, 2021

(54) METHOD FOR MEASURING AND MODELING SPACES USING MARKERLESS AUGMENTED REALITY

(71) Applicant: Smart Picture Technologies, Inc., Austin, TX (US)

(72) Inventors: Dejan Jovanovic, Austin, TX (US); Andrew Kevin Greff, Austin, TX (US)

(73) Assignee: SMART PICTURE TECHNOLOGIES, INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/862,272

(22) Filed: Apr. 29, 2020

(65) Prior Publication Data

US 2021/0082189 A1    Mar. 18, 2021

Related U.S. Application Data

(63) Continuation of application No. 16/387,221, filed on Apr. 17, 2019, now Pat. No. 10,679,424, which is a
(Continued)

(51) Int. Cl.
*G06T 15/00* (2011.01)
*G06T 19/00* (2011.01)
(Continued)

(52) U.S. Cl.
CPC ........... *G06T 19/006* (2013.01); *G01S 17/89* (2013.01); *G06F 3/011* (2013.01);
(Continued)

(58) Field of Classification Search
CPC ..... G06T 17/00; G06T 19/003; G06T 19/006; G06T 19/20
See application file for complete search history.

(56) References Cited

U.S. PATENT DOCUMENTS

| 3,711,831 A | 1/1973 | Kaneko et al. |
| 4,801,207 A | 1/1989 | Williams |

(Continued)

FOREIGN PATENT DOCUMENTS

| DE | 19536294 A1 | 4/1997 |
| DE | 202012104890 U1 | 3/2013 |

(Continued)

OTHER PUBLICATIONS

Cain et al. Drawing Accurate Ground Plans Using Optical Triangulation Data. 2003 IEEE Conference on Computer Vision and Pattern Recognition (11 pgs) (Jun. 18-20, 2003).
(Continued)

*Primary Examiner* — Charles Tseng
(74) *Attorney, Agent, or Firm* — Wilson Sonsini Goodrich & Rosati

(57) ABSTRACT

Described herein are devices, systems, media, and methods using an augmented reality smartphone application to capture measurements of an interior or exterior space in real-time and generate a floorplan of the space and/or a 3D model of the space from the captured measurements in less than 5 minutes.

20 Claims, 30 Drawing Sheets

Related U.S. Application Data continuation of application No. 16/058,595, filed on Aug. 8, 2018, now Pat. No. 10,304,254.

(60) Provisional application No. 62/542,714, filed on Aug. 8, 2017.

(51) Int. Cl.

| *G06T 17/00* | (2006.01) |
|---|---|
| *G01S 17/89* | (2020.01) |
| *G06F 3/01* | (2006.01) |
| *G06F 3/0481* | (2013.01) |
| *G06T 7/70* | (2017.01) |

(52) U.S. Cl.
CPC ............ *G06F 3/04815* (2013.01); *G06T 7/70* (2017.01); *G06T 17/00* (2013.01); *G06T 2200/08* (2013.01); *G06T 2200/24* (2013.01); *G06T 2210/04* (2013.01); *G06T 2219/004* (2013.01)

(56) References Cited

U.S. PATENT DOCUMENTS

| 5,481,622 | A | 1/1996 | Gerhardt et al. |
|---|---|---|---|
| 5,699,444 | A | 12/1997 | Palm |
| 6,125,197 | A | 9/2000 | Mack et al. |
| 6,356,298 | B1 | 3/2002 | Abe et al. |
| 6,415,051 | B1 | 7/2002 | Callari et al. |
| 7,058,213 | B2 | 6/2006 | Rubbert et al. |
| 7,239,732 | B1 | 7/2007 | Yamada |
| 7,256,899 | B1 | 8/2007 | Faul et al. |
| 8,031,909 | B2 | 10/2011 | Se et al. |
| 8,294,958 | B2 | 10/2012 | Paterson et al. |
| 8,351,686 | B2 | 1/2013 | Graesser |
| 8,605,987 | B2 | 12/2013 | Chao et al. |
| 8,885,916 | B1 | 11/2014 | Maurer et al. |
| 8,922,647 | B2 | 12/2014 | Crothers et al. |
| 9,131,223 | B1 | 9/2015 | Rangarajan et al. |
| 9,157,757 | B1 | 10/2015 | Liao et al. |
| 9,766,075 | B2 | 9/2017 | Foxlin |
| 10,066,016 | B2 | 9/2018 | Jovanovic et al. |
| 10,083,522 | B2 | 9/2018 | Jovanovic et al. |
| 10,304,254 | B2 | 5/2019 | Jovanovic et al. |
| 2003/0012410 | A1 | 1/2003 | Navab et al. |
| 2003/0068098 | A1 | 4/2003 | Rondinelli et al. |
| 2003/0091227 | A1 | 5/2003 | Chang et al. |
| 2003/0095338 | A1 | 5/2003 | Singh et al. |
| 2003/0128401 | A1 | 7/2003 | Conrow et al. |
| 2004/0095385 | A1 | 5/2004 | Koo et al. |
| 2004/0239688 | A1 | 12/2004 | Krajec |
| 2005/0031167 | A1 | 2/2005 | Hu et al. |
| 2005/0123179 | A1 | 6/2005 | Chen et al. |
| 2005/0213082 | A1 | 9/2005 | Dibernardo et al. |
| 2005/0261849 | A1 | 11/2005 | Kochi et al. |
| 2006/0017720 | A1 | 1/2006 | Li |
| 2006/0056707 | A1 | 3/2006 | Suomela et al. |
| 2006/0210192 | A1 | 9/2006 | Orhun |
| 2007/0065004 | A1 | 3/2007 | Kochi et al. |
| 2008/0062164 | A1 | 3/2008 | Bassi et al. |
| 2008/0075324 | A1 | 3/2008 | Sato et al. |
| 2008/0095468 | A1 | 4/2008 | Klemmer et al. |
| 2008/0123937 | A1 | 5/2008 | Arias et al. |
| 2008/0159595 | A1 | 7/2008 | Park et al. |
| 2008/0201101 | A1 | 8/2008 | Hebert et al. |
| 2008/0208164 | A1 | 8/2008 | Kim et al. |
| 2008/0208547 | A1 | 8/2008 | Kim et al. |
| 2009/0012667 | A1 | 1/2009 | Matsumoto et al. |
| 2009/0268214 | A1 | 10/2009 | Lucic et al. |
| 2010/0017178 | A1 | 1/2010 | Tsuk et al. |
| 2010/0053591 | A1 | 3/2010 | Gibson et al. |
| 2010/0076631 | A1 | 3/2010 | Mian |
| 2010/0104199 | A1 | 4/2010 | Zhang et al. |
| 2010/0201809 | A1 | 8/2010 | Oyama et al. |
| 2011/0050640 | A1 | 3/2011 | Lundback et al. |
| 2011/0106312 | A1 | 5/2011 | Chen et al. |
| 2011/0123135 | A1 | 5/2011 | Hsieh et al. |
| 2011/0205340 | A1 | 8/2011 | Garcia et al. |
| 2012/0007943 | A1 | 1/2012 | Tytgat |
| 2012/0020518 | A1 | 1/2012 | Taguchi |
| 2012/0062702 | A1 | 3/2012 | Jiang et al. |
| 2012/0113142 | A1 | 5/2012 | Adhikari et al. |
| 2012/0176380 | A1 | 7/2012 | Wang et al. |
| 2012/0215500 | A1 | 8/2012 | Ciuti et al. |
| 2012/0218437 | A1 | 8/2012 | Hermary et al. |
| 2012/0287240 | A1 | 11/2012 | Grossmann et al. |
| 2012/0293667 | A1 | 11/2012 | Baba et al. |
| 2013/0033596 | A1 | 2/2013 | Crothers et al. |
| 2013/0063613 | A1 | 3/2013 | Conwell |
| 2013/0076894 | A1 | 3/2013 | Osman |
| 2013/0076896 | A1 | 3/2013 | Takabayashi et al. |
| 2013/0136341 | A1 | 5/2013 | Yamamoto |
| 2013/0162785 | A1 | 6/2013 | Michot et al. |
| 2013/0278755 | A1 | 10/2013 | Starns et al. |
| 2013/0307932 | A1 | 11/2013 | Mestha et al. |
| 2013/0321585 | A1 | 12/2013 | Hassebrook et al. |
| 2013/0324830 | A1 | 12/2013 | Bernal et al. |
| 2014/0140579 | A1 | 5/2014 | Takemoto |
| 2014/0143096 | A1 | 5/2014 | Stubert et al. |
| 2014/0210950 | A1 | 7/2014 | Atanassov et al. |
| 2014/0211018 | A1 | 7/2014 | De et al. |
| 2014/0307100 | A1 | 10/2014 | Myllykoski et al. |
| 2014/0314276 | A1 | 10/2014 | Wexler et al. |
| 2014/0320661 | A1 | 10/2014 | Sankar et al. |
| 2014/0375793 | A1 | 12/2014 | Harada et al. |
| 2015/0181198 | A1 | 6/2015 | Baele et al. |
| 2015/0260509 | A1 | 9/2015 | Kofman et al. |
| 2015/0292873 | A1 | 10/2015 | Chou et al. |
| 2015/0316368 | A1 | 11/2015 | Moench et al. |
| 2015/0330775 | A1 | 11/2015 | Basevi et al. |
| 2015/0331576 | A1 | 11/2015 | Piya et al. |
| 2015/0331970 | A1 | 11/2015 | Jovanovic et al. |
| 2015/0347827 | A1 | 12/2015 | Dickinson et al. |
| 2015/0369593 | A1 | 12/2015 | Myllykoski |
| 2016/0044301 | A1 | 2/2016 | Jovanovic et al. |
| 2016/0134860 | A1 | 5/2016 | Jovanovic et al. |
| 2016/0148433 | A1 | 5/2016 | Petrovskaya et al. |
| 2016/0227193 | A1 | 8/2016 | Osterwood et al. |
| 2016/0260250 | A1 | 9/2016 | Jovanovic et al. |
| 2016/0321827 | A1 | 11/2016 | Xiao et al. |
| 2016/0358384 | A1* | 12/2016 | Marche ............... G01N 21/8851 |
| 2017/0249745 | A1 | 8/2017 | Fiala |
| 2018/0021597 | A1 | 1/2018 | Berlinger et al. |
| 2018/0300551 | A1 | 10/2018 | Luccin et al. |
| 2019/0051054 | A1 | 2/2019 | Jovanovic et al. |
| 2019/0347859 | A1 | 11/2019 | Jovanovic et al. |

FOREIGN PATENT DOCUMENTS

| EP | 2554940 A1 | 2/2013 |
|---|---|---|
| FR | 2924560 A1 | 6/2009 |
| WO | WO-2006027339 A2 | 3/2006 |
| WO | WO-2007030026 A1 | 3/2007 |
| WO | WO-2013033787 A1 | 3/2013 |
| WO | WO-2013155379 A2 | 10/2013 |
| WO | WO-2015023483 A1 | 2/2015 |
| WO | WO-2015073590 A2 | 5/2015 |
| WO | WO-2015134794 A2 | 9/2015 |
| WO | WO-2015134795 A2 | 9/2015 |
| WO | WO-2019032736 A1 | 2/2019 |
| WO | WO-2020231872 A1 | 11/2020 |

OTHER PUBLICATIONS

Co-pending U.S. Appl. No. 16/870,679, filed May 8, 2020.
Horn et al. Determining optical Flow: a retrospective. Artificial Intelligence 17:185-203 (1981).
Kawasaki et al. Entire model acquisition system using handheld 3D digitizer. 3D Data Processing, Visualization and Transmission, 2004. 3DPVT 2004. Proceedings. 2nd International Symposium on. (pp. 478-485) (Sep. 6-9, 2004).
Klein et al. Parallel Tracking and Mapping for Small AR Workspaces. Mixed and Augmented Reality. ISMAR 2007. 6th IEEE and ACM International Symposium on.(10 pgs) (Nov. 13-16, 2007).

(56) References Cited

OTHER PUBLICATIONS

Newcombe et al. DTAM: Dense Tracking and Mapping in Real Time. Computer Vision (ICCV), 2011 IEEE International Conference on. (8 pgs) (Nov. 6-13, 2011).
Nguyen et al. A Simple Method for Range Finding via Laser Triangulation. Technical Document 2734. published by the United States Naval Command, Control and Ocean Surveillance Center, RDT&E Division and NRAD (12 pgs) (Jan. 1995).
PCT/US2013/036314 International Search Report and Written Opinion dated Nov. 15, 2013.
PCT/US2014/049900 International Search Report and Written Opinion dated Dec. 10, 2014.
PCT/US2014/065309 International Search Report and Written Opinion dated May 20, 2015.
PCT/US2015/019040 International Search Report and Written Opinion dated Feb. 17, 2016.
PCT/US2015/019041 International Search Report and Written Opinion dated Mar. 31, 2016.
PCT/US2018/045861 International Search Report and Written Opinion dated Oct. 29, 2018.
Sankar et al. Capturing Indoor Scenes with Smartphones. UIST'12 Proceedings of the 25th annual ACM symposium on User interface software and technology. Cambridge, MA Oct. 7-10, 2012. Retrieved on Oct. 11, 2018 from the Internet< url: https://dl.acm.org/citation.cfm?id=2380116.2380168> (pp. 403-412) (2012)</url:>.
Tanskanen et al. Live Metric 3D Reconstruction on Mobile Phones. Computer Vision (ICCV), 2013 IEEE International Conference on. (pp. 65-72) (Dec. 1-8, 2013).
U.S. Appl. No. 13/861,534 Office Action dated Dec. 24, 2015.
U.S. Appl. No. 13/861,534 Office Action dated Jan. 30, 2015.
U.S. Appl. No. 13/861,685 Office Action dated Dec. 4, 2015.
U.S. Appl. No. 13/861,685 Office Action dated Jul. 27, 2016.
U.S. Appl. No. 13/861,685 Office Action dated Mar. 13, 2015.
U.S. Appl. No. 14/308,874 Office Action dated Apr. 3, 2018.
U.S. Appl. No. 14/308,874 Office Action dated Apr. 8, 2016.
U.S. Appl. No. 14/308,874 Office Action dated Aug. 3, 2017.
U.S. Appl. No. 14/308,874 Office Action dated Aug. 8, 2019.
U.S. Appl. No. 14/308,874 Office Action dated Nov. 30, 2018.
U.S. Appl. No. 14/452,937 Office Action dated Jan. 12, 2017.
U.S. Appl. No. 14/539,924 Office Action dated Oct. 6, 2016.
U.S. Appl. No. 14/639,912 Office Action dated Jan. 11, 2017.
U.S. Appl. No. 14/745,325 Office Action dated Jul. 27, 2017.
U.S. Appl. No. 14/745,325 Office Action dated Mar. 7, 2018.
U.S. Appl. No. 15/123,662 Office Action dated Dec. 28, 2017.
U.S. Appl. No. 16/387,221 Office Action dated Oct. 8, 2019.
ZUCCHELLI. Optical Flow based Structure from Motion. Doctoral Dissertation (142 pgs) (2002).
PCT/US2020/032246 International Search Report and Written Opinion dated Aug. 6, 2020.
U.S. Appl. No. 14/308,874 Office Action dated May 21, 2020.
U.S. Appl. No. 16/870,679 Office Action dated Nov. 13, 2020.
U.S. Appl. No. 14/308,874 Office Action dated Jan. 6, 2021.
U.S. Appl. No. 16/870,679 Office Action dated Mar. 2, 2021.

* cited by examiner

METHOD FOR MEASURING AND MODELING SPACES USING MARKERLESS AUGMENTED REALITY

CROSS-REFERENCE

This application is a continuation of U.S. application Ser. No. 16/387,221, filed Apr. 17, 2019, which is a continuation of U.S. application Ser. No. 16/058,595, filed on Aug. 8, 2018, now issued as U.S. Pat. No. 10,304,254 on May 28, 2019, which claims the benefit of U.S. Provisional Application No. 62/542,714, filed Aug. 8, 2017, entitled "Method for Measuring and Modeling Spaces Using Markerless Augmented Reality," the contents of each are incorporated herein by reference for all purposes.

SUMMARY OF THE INVENTION

Aspects provided herein disclose electronic devices for generating a floorplan and/or fully annotated 3D model of a space using an augmented reality (AR) application running on the electronic device, the device comprising: a) a camera configured to capture a sequence of images from a sequence of poses of a space; b) a screen configured to allow a user of the electronic device to interact with an augmented reality (AR) application via an augmented reality (AR) interface; and c) an augmented reality (AR) engine configured to: i) receive, from a resource of the electronic device, the position and orientation of the electronic device in reference to a fixed coordinate system; ii) receive, from the resource of the electronic device, the position and orientation of a ground plane in a space in reference to the fixed coordinate system; iii) provide, to the user via the AR application, an AR interface for identifying positions of corners of a floor of the space; iv) receive, from a user via the AR interface, indications of the positions of the corners of the floor in reference to the fixed coordinate system, wherein the application is configured to project a reference point on the screen into a ray in world coordinates and determine an intersection point with the ground plane via hit-testing thus detecting the corners of the floor of the space; v) assemble the detected corners into a floorplan of the space, wherein each corner of the detected corners is connected with a measured line comprising distance annotations; vi) generate virtual quasi-infinite vertical planes extending from each corner of the detected corners representing virtual walls of the space; vii) receive, from the user via the AR interface, indications of intersection points between the ceiling and the virtual walls (ceiling intersections) using the reference point on the screen, wherein each of the ceiling intersections is connected with a measured line comprising distance annotations; viii) truncate the virtual walls to reflect the ceiling height in the space; ix) receive, from a user via the AR interface, indications of segments of the vertical planes representing openings; and x) assemble the floorplan, the truncated virtual walls, virtual ceiling into a three-dimensional (3D) model of the space in world coordinates. In some embodiments, the camera is configured to capture a video, and/or a frame of a video. In some embodiments, the space is an interior or exterior space and the floorplan is an interior or exterior floorplan. In some embodiments, the AR interface comprises an active reticle configured to scale with distance that (i) enables the user to provide the AR engine with indications and (ii) indicates whether the user is viewing the vertical plane, the virtual floor, or the virtual ceiling. In some embodiments, indications received by the device from the user via the AR interface comprise touchscreen gestures or voice commands recognized by the AR application. In some embodiments, the opening comprises a door, a window, a duct, a vent, or electrical outlet, or any combination thereof. In some embodiments, the AR interface is further configured to allow the user to move or adjust the positions of the corners of the floor, intersection points between the ceiling and the virtual walls, and/or the segments thereby reducing drift error. In some embodiments, the AR engine is further configured to: i) identify corners of objects on the vertical walls, virtual floor, and/or virtual ceiling of the space; ii) receive, from the user via the AR interface, indications of the corners of the objects on the truncated virtual walls, virtual floor and/or virtual ceiling, wherein the application projects a reference point on the screen into a ray in world coordinates and determines an intersection point with the virtual wall, virtual floor, and/or virtual ceiling, via hit-testing thus measuring the objects; iii) configure the corners indicated by the user into linear measurements, shapes, and positions representing the objects; and iv) superimpose the objects onto the truncated virtual walls, virtual floor, and/or virtual ceiling, of the floorplan of the space. In some embodiments, the shapes comprise squares, rectangles, polygons, circles, semi-circles, ovals, or curves. In some embodiments, the shapes represent doors, windows, wall openings, electrical outlets, vents, ducts, counters, island counters, cabinets, appliances, or damage in the space. In some embodiments, the AR engine is further configured to assemble the floorplan, the truncated virtual walls, virtual ceiling, and the objects into a 3D model of the space in world coordinates. In some embodiments, the AR engine is further configured to export the floorplan, ceiling height measurements, and/or 3D model into the cloud back-end, and wherein the AR engine or the cloud back-end is configured to convert the floorplan, ceiling height measurements, and/or 3D model into one or more formats compatible with commercial design software. In some embodiments, the one or more formats comprises a tabulated list for subsequent use. In some embodiments, the tabulated list is used to generate a materials list for a project involving the space. In some embodiments, the tabulated list comprises a JSON format. In some embodiments, the AR engine is further configured to export still images or video of an AR session recorded by the AR application at the AR interface. In some embodiments, the distance annotations are generated in a 2D image plane, and wherein the AR engine is further configured to map the distance annotations in three-dimensional (3D) world coordinates to 2D image plane coordinates, thereby reducing the need to scale with distance.

Aspects provided herein disclose methods of generating a floorplan of a space using an augmented reality (AR) application running on an electronic device comprising a camera and a screen, the method comprising: a) receiving, from a resource of an electronic device, the position and orientation of the electronic device in reference to a fixed coordinate system; b) receiving, from the resource of the electronic device, the position and orientation of a ground plane in a space in reference to the fixed coordinate system; c) providing, to the user via the augmented reality (AR) application, an augmented reality (AR) interface for identifying positions of corners of a floor of the space; d) receiving, from a user via the AR interface, indications of the positions of the corners of the floor in reference to the fixed coordinate system, wherein the application is configured to project a reference point on the screen into a ray in world coordinates and determine an intersection point with the ground plane via hit-testing thus detecting the corners of the floor of the space; e) assembling the detected corners into a floorplan of the space, wherein each corner of the detected corners is connected with a measured line comprising distance annotations; f) generating virtual quasi-infinite vertical planes extending from each corner of the detected corners representing virtual walls of the space; g) receiving, from the user via the AR interface, indications of intersection points between the ceiling and the virtual walls (ceiling intersections) using the reference point on the screen, wherein each of the ceiling intersections is connected with a measured line comprising distance annotations; h) truncating the virtual walls to reflect the ceiling height in the space; i) receiving, from a user via the AR interface, indications of segments of the vertical planes representing openings; and j) assembling the floorplan, the truncated virtual walls, virtual ceiling into a 3D model of the space in world coordinates. In some embodiments, the space is an interior or exterior space and the floorplan is an interior or exterior floorplan. In some embodiments, the AR interface comprises an active reticle configured to scale with distance that (i) enables the user to provide the AR application with indications and (ii) indicates whether the user is viewing the vertical plane, the virtual floor, or the virtual ceiling. In some embodiments, indications received by the device from the user via the AR interface comprise touchscreen gestures or voice commands recognized by the AR application. In some embodiments, the opening comprises a door, a window, a duct, a vent, or electrical outlet, or any combination thereof. In some embodiments, the AR interface is further configured to allow the user to move or adjust the positions of the corners of the floor, intersection points between the ceiling and the virtual walls, and/or the segments thereby reducing drift error. In some embodiments, the methods further comprise: a) identifying corners of objects on the vertical walls, virtual floor, and/or virtual ceiling of the space; b) receiving, from the user via the AR interface, indications of the corners of the objects on the truncated virtual walls, virtual floor and/or virtual ceiling, wherein the application projects a reference point on the screen into a ray in world coordinates and determines an intersection point with the virtual wall, virtual floor, and/or virtual ceiling, via hit-testing thus measuring the objects; c) configuring the corners indicated by the user into linear measurements, shapes, and positions representing the objects; and d) superimposing the objects onto the truncated virtual walls, virtual floor, and/or virtual ceiling, of the floorplan of the space. In some embodiments, the shapes comprise squares, rectangles, polygons, circles, semicircles, ovals, or curves. In some embodiments, the shapes represent doors, windows, wall openings, electrical outlets, vents, ducts, counters, island counters, cabinets, appliances, or damage in the space. In some embodiments, the methods further comprise assembling the floorplan, the truncated virtual walls, virtual ceiling, and the objects into a three-dimensional (3D) model of the space in world coordinates. In some embodiments, the methods further comprise: a) exporting the floorplan, ceiling height measurements, and/or 3D model into the cloud back-end; and b) converting the floorplan, ceiling height measurements, and/or 3D model into one or more formats compatible with commercial design software. In some embodiments, the one or more formats comprises a tabulated list for subsequent use. In some embodiments, the tabulated list comprises a JSON format. In some embodiments, the methods further comprise exporting still images or video of an AR session recorded by the AR application at the AR interface.

A non-transitory computer-readable storage medium storing executable computer program instructions, the instructions executable by at least one processor of an electronic device to generate a floorplan of a space using an augmented reality (AR) application by performing at least the following: a) receiving, from a resource of the electronic device, the position and orientation of the electronic device in reference to a fixed coordinate system; b) receiving, from the resource of the electronic device, the position and orientation of a ground plane in a space in reference to the fixed coordinate system; c) providing, to the user via the AR application, an augmented reality (AR) interface for identifying positions of corners of a floor of the space; d) receiving, from a user via the AR interface, indications of the positions of the corners of the floor in reference to the fixed coordinate system, wherein the application is configured to project a reference point on the screen into a ray in world coordinates and determine an intersection point with the ground plane via hit-testing thus detecting the corners of the floor of the space; e) assembling the detected corners into a floorplan of the space, wherein each corner of the detected corners is connected with a measured line comprising distance annotations; f) identifying ceiling intersections and generate virtual quasi-infinite vertical planes representing virtual walls of the space, wherein each of the ceiling intersections is connected with a measured line comprising distance annotations; g) receiving, from a user via the AR interface, indications of segments of the vertical planes representing openings; h) generating virtual quasi-infinite vertical planes extending from each corner of the detected corners representing virtual walls of the space; i) receiving, from the user via the AR interface, indications of intersection points between the ceiling and the virtual walls (ceiling intersections) using the reference point on the screen, wherein each of the ceiling intersections is connected with a measured line comprising distance annotations; j) truncating the virtual walls to reflect the ceiling height in the space; k) receiving, from a user via the AR interface, indications of segments of the vertical planes representing openings; and l) assembling the floorplan, the truncated virtual walls, virtual ceiling into a three-dimensional (3D) model of the space in world coordinates. In some embodiments, the instructions are further executable to perform steps of: a) identifying corners of objects on the vertical walls, virtual floor, and/or virtual ceiling of the space; b) receiving, from the user via the AR interface, indications of the corners of the objects on the truncated virtual walls, virtual floor and/or virtual ceiling, wherein the application projects a reference point on the screen into a ray in world coordinates and determines an intersection point with the virtual wall, virtual floor, and/or virtual ceiling, via hit-testing thus measuring the objects; c) configuring the corners indicated by the user into linear measurements, shapes, and positions representing the objects; and d) superimposing the objects onto the truncated virtual walls, virtual floor, and/or virtual ceiling, of the floorplan of the space. In some embodiments, the shapes comprise squares, rectangles, polygons, circles, semicircles, ovals, or curves. In some embodiments, the shapes represent doors, windows, wall openings, electrical outlets, vents, ducts, counters, island counters, cabinets, appliances, or damage in the space. In some embodiments, the space is an interior or exterior space and the floorplan is an interior or exterior floorplan. In some embodiments, the AR interface comprises an active reticle configured to scale with distance that (i) enables the user to provide the AR engine with indications and (ii) indicates whether the user is viewing the vertical plane, the virtual floor, or the virtual ceiling. In some embodiments, indications received by the device from the user via the AR interface comprise touchscreen gestures or voice commands recognized by the AR application. In some embodiments, the opening comprises a door, a window, a duct, a vent, or electrical outlet, or any combination thereof. In some embodiments, the AR interface is further configured to allow the user to move or adjust the positions of the corners of the floor, intersection points between the ceiling and the virtual walls, and/or the segments thereby reducing drift error.

In some embodiments, the AR engine is further configured to assemble the floorplan, the truncated virtual walls, virtual ceiling, and the objects into a three-dimensional (3D) model of the space in world coordinates. In some embodiments, the instructions are further executable to perform steps of: a) exporting the floorplan, ceiling height measurements, and/or 3D model into the cloud back-end; and b) converting the floorplan, ceiling height measurements, and/or 3D model into one or more formats compatible with commercial design software. In some embodiments, the one or more formats comprises a tabulated list for subsequent use. In some embodiments, the tabulated list is used to generate a materials list for a project involving the space. In some embodiments, the tabulated list comprises a JSON format. In some embodiments, the instructions are further executable to perform steps of exporting still images or video of an AR session recorded by the AR application at the AR interface. In some embodiments, the distance annotations are generated in a 2D image plane, and wherein the AR engine is further configured to map the distance annotations in 3D world coordinates to 2D image plane coordinates, thereby reducing the need to scale with distance.

Certain Definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

"Hit testing" or "ray casting," as used herein, refers to the use of a ray that intersects extending perpendicular to the screen of an electronic device that is useful for solving a variety of computational geometry. In some aspects, disclosed herein, ray casting uses a geometric ray tracing algorithm.

"Augmented reality," or "AR," as used herein, refers to an interactive experience of a real-world environment whereby the objects that reside in the real-world are augmented by computer-generated perceptual information.

"World tracking origin," as used herein, refers to the origin of the fixed coordinate system of the world coordinate system disclosed herein. In some embodiments, the origin is gravity (e.g., a ground plane or floor). In some embodiments, the AR application disclosed herein establishes a fixed coordinate system based a world tracking origin comprising gravity.

"Fixed coordinate system" or "world coordinate system," as used herein, refers to a real-world coordinate system that is fixed and oriented to a world tracking origin.

"User experience construct" or "UX," as used herein, refers to functionality provided by the devices, systems, methods, and media that enable the user generate a 3D model of a floorplan, and/or space.

BRIEF DESCRIPTION OF THE DRAWINGS

An understanding of the features and advantages of the described subject matter will be obtained by reference to the following detailed description that sets forth illustrative embodiments and the accompanying drawings of which.

DETAILED DESCRIPTION OF THE INVENTION

Figure 1:
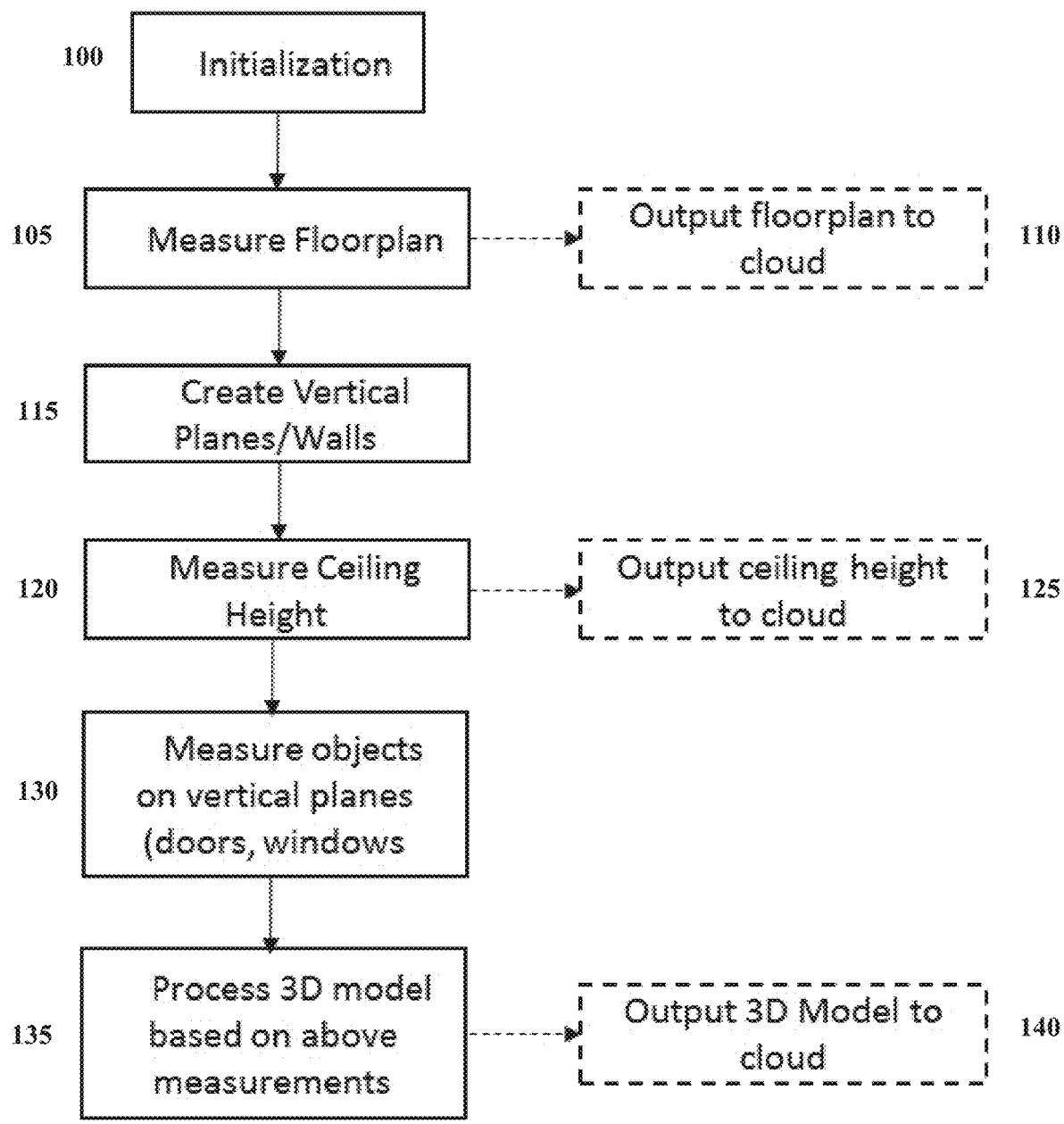
FIG. 1 exemplifies a flow diagram; in this case, a flow diagram illustrating a process for using an augmented reality (AR)-enabled mobile application to make measurements of a space and generate a three-dimensional (3D) model of the space.

The main disadvantages to smartphone-based photogrammetry have been low accuracy due to both on-board camera limitations (e.g., resolution, dynamic range, etc.) and processing hardware (e.g., CPU, power drain, etc.). Alternative non-smartphone-based technologies using advanced sensors (e.g., time-of-flight) generally demonstrate higher accuracy than smartphone-based photogrammetry. However, their high cost and lack of availability, along with the substantial manual processing needed to transform point-clouds into architectural models, significantly limit their range of use. Accuracy and user-experience are the primary factors affecting how broadly given technologies can be embedded into the marketplace and are therefore of paramount importance in determining a given solution's application space. In general, the combination of accuracy and ease-of-use are together the main trade-off drivers in comparing photogrammetric technologies.

The present approach demonstrates the ability to generate fully annotated 3D models of a space using a smartphone that is at least as accurate as prior technologies based on advanced sensors, while reducing user time commitment to 2-5 minutes. Described herein are devices, methods, systems, and media for capturing floorplans, vertical measurements floor-to-ceiling height, measurement of objects such as doors/windows, and generation of 3D interior models within smartphones with a 2-5 minute user time commitment. The devices, methods, systems, and media described herein use markerless augmented reality (AR), that, in some embodiments, is enabled by a smartphone vendor (e.g., Apple's ARKit) and a constrained workflow that sequentially builds a 3D model of an interior from floorplan→ceiling height→walls→measurement of doors/windows/objects→3D Model. Images/videos, and data related to the camera position and location, taken by the user during a live AR session are incorporated into the model(s). The constraints on the user are minimized by embedding the workflow into a measurement based flow which reduces the time to completion. During the live AR session, key assets in the flow such as the floorplan model, walls-only model, full 3D model with doors/windows/objects identified in the space, and/or images/videos are transmitted to a cloud back-end for further processing. From the cloud back-end, data generated during the live AR session (e.g., 3D models, measurements, images/videos) are viewable in an interactive cloud portal. Distribution of the key assets in the flow to enterprise entities (e.g., general building contractor, design firm, or architect) from the cloud portal are used for a variety of applications.

Disclosed herein are devices, systems, methods, and media for generating a three-dimensional (3D) model of a space using an augmented reality (AR) application running on the electronic device that is configured to communicate via a computer network to a cloud back-end. In some instances, the electronic device comprises (i) a camera that captures a sequence of images from a sequence of poses of an indoor or outdoor space, (ii) a screen configured to allow a user of the electronic device to interact with the AR application, and (iii) an augmented reality (AR) engine configured to generate a 3D model of the space with less user time commitment (2 to 5 minutes). In some embodiments, objects within the space (e.g., windows, vents, doors, counters, appliances, islands, or other fixtures) are measured and included in the 3D model. In some embodiments, measurements and renderings of the floor space, walls, ceiling, features or objects, and/or the 3D model of the space are exported to the cloud back-end, and converted into a format compatible with design software. In some embodiments, the format is a (JavaScript Object Notation) JSON format. In some embodiments, images and/or videos taken by the AR application in a user's AR session are exported to the cloud back-end, and incorporated into the 3D model. In some embodiments, the cloud back-end may be accessed via a cloud portal, wherein the 3D model, measurements, photos and/or videos, may be viewed by the user in an interactive user experience. The devices, systems, methods and media disclosed herein do not require use of markers, and instead relies on visual inertial odometry platforms either brought into the smartphone as $3^{rd}$ party software or native visual-inertial odometry (VIO) based software development kit (SDK), such as Apple's ARKit.

Overview

Referring to FIG. 1, in a particular example, the devices, systems, media, and methods described herein implement a process beginning with initialization of an AR application 100. A user employs an AR interface of the application to measure the perimeter of the floor of a space, interacting with the interface (e.g., by voice, touchscreen gesture, etc.) to start and end a series of segmental measurements of the floor 105, which form a closed loop around the outer edge of the floor. Using the measurements, a floorplan is generated and optionally exported to a back-end system running in a cloud computing environment 110. The floorplan is extended vertically to create infinite vertical planes representing walls 115. Next, the user employs the AR interface of the application to measure floor-to-ceiling height, interacting with the interface (e.g., by voice, touchscreen gesture, etc.) to start and end the vertical measurements 120. The ceiling height is optionally exported to a back-end system running in a cloud computing environment 125. Finally, the user employs the AR interface of the application to measure objects and features within the space (e.g., doors, windows, etc.), interacting with the interface (e.g., by voice, touchscreen gesture, etc.) to start and end measurements on vertical planes of the space 130. Using the floorplan, the ceiling height, and the measurements of the features/objects, a three-dimensional (3D) model of the space is generated 135 and optionally exported to a back-end system running in a cloud computing environment 140.

In some embodiments, the augmented reality (AR) application runs entirely locally, e.g., at the mobile device. In such embodiments, not only the measurement steps, but also the processing steps, such as generating a floorplan of the space and/or generating a 3D model of the space are performed by the AR application locally at the mobile device. Moreover, in such embodiments, the AR application operates in non-connected environments, e.g., remote environments where no (or only inadequate) Wi-Fi or cellular connectivity is available. In other embodiments, the AR application runs locally and the measurement steps as well as the processing steps are performed locally at the mobile device; however, some or all of the outputs of the AR application, e.g., the floorplan of the space, the calculated floor-to-ceiling height, and/or the 3D model of the space, are exported or uploaded to the cloud computing element. In yet other embodiments, the AR application runs locally and the measurement steps are performed at the mobile device, but the measurement data is exported or uploaded to the cloud computing element for processing. In such embodiments, the processing steps, such as generating a floorplan of the space and/or generating a 3D model of the space are performed at the cloud computing system.

Application Client Code

Mobile Application

Aspects disclosed herein provide AR applications configured to run on an electronic device. In some embodiments, the electronic device is configured to communicate via a computer network to a cloud back-end. The AR applications provide the user with an AR interface for identifying points in a 2D image plane representing actual positions of corners in a floor space or objects in the space, and/or intersection points between the ceiling or floor and the vertical wall(s). In some embodiments, the AR application comprises an active reticle that enables the user to indicate positions of corners and/or intersection points to the AR application via the AR interface. In some embodiments, the active reticle scales with distance as it tracks the user's movement in the 3D environment via the AR interface. In some embodiments, the active reticle is configured to indicate to the user whether the user is viewing a vertical plane, floor space, or ceiling plane. In some embodiments, the active reticle becomes smaller as the user lifts the electronic device from a downward position (e.g., pointing the electronic device at the floor) in an upward direction (e.g., pointing the electronic device at a vertical wall). In some embodiments, the active reticle has a design suited for tracking movement of the user in the three-dimensional (3D) environment. Non-limiting examples of a design of the active reticle include, but are not limited to, a circular shape comprising crosshairs, dots, posts, circles, scales, chevrons, or a combination thereof.

In various embodiments, the devices, methods, systems, and media disclosed herein comprise at least one computer program, or use of the same. A computer program includes a sequence of instructions, executable in the computing device's CPU, written to perform a specified task. Computer readable instructions may be implemented as program modules, such as functions, objects, Application Programming Interfaces (APIs), data structures, and the like, that perform particular tasks or implement particular abstract data types. The computer program may be written in any suitable version of any suitable language. The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes the mobile application disclosed herein provided to an electronic device. In some embodiments, the mobile application is provided to the electronic device at the time it is manufactured. In other embodiments, the mobile application is provided to a mobile digital processing device via the computer network described herein.

A mobile application is created using any suitable hardware, languages, and development environments. Mobile applications are written in several languages, including, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

In aspects disclosed herein, the augmented reality (AR) applications are driven by an application computer program code using a mobile application development environment provided on an electronic device. In preferred embodiments, the electronic device comprises a smartphone, and the mobile application development environment comprises an SDK. In some embodiments, the computer program client code flow comprises the steps of (1) calibration, (2) floorplan generation, (3) ceiling height measurement, (4) rendering of openings and walls, (5) object rendering, (6) assembling of the virtual floorplan, virtual walls, virtual ceiling into a three-dimensional (3D) model of the space, and/or (7) reusing the 3D model. Several aspects of the client code flow include, but are not limited to, the user experience (UX) constructs that provide the advantages disclosed herein. In some embodiments, the user exports data generated from any one of the above steps, or any combination thereof, to a cloud back-end to use for a project related to the space.

Calibration

Figure 29:
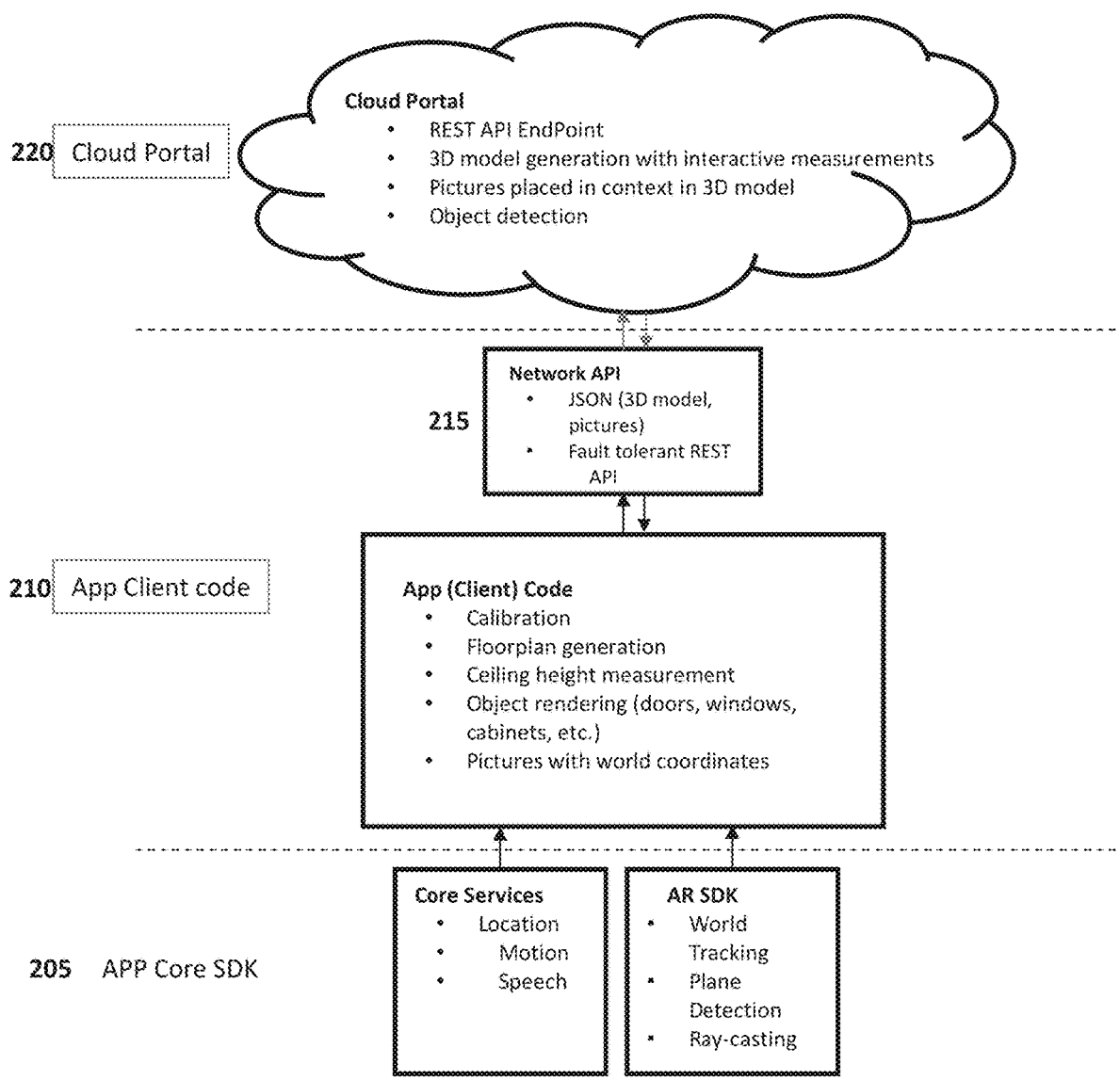
FIG. 29 exemplifies a block diagram of the system disclosed herein. The system comprises the core SDK, application client code, and cloud back-end.

Referring to FIG. 29, a world tracking origin is used to detect a ground plane using a mobile application development environment of an electronic device, 205. In some embodiments, the mobile application development environment comprises the iPhone and iPad (iOS) SDK. In yet another embodiment, the mobile application development environment comprises the Android™ SDK. The application client code, 210, enables the ground plane to be detected by the AR application when the user points the electronic device at the ground. In some embodiments, the user is prompted by the AR application to point the electronic device at the ground. In some embodiments, the user is prompted by the AR applications to move the electronic device while it is pointed at the ground. A non-limiting example of a movement useful for calibrating the AR application includes a circular movement of the electronic device. A non-limiting example of a fixed coordinate system that may be utilized to calibrate the AR application include UICoordinateSpace protocol.

A reticle is displayed on the augmented reality (AR) interface via the AR application once the calibration is complete. In some embodiments, the reticle comprises an active reticle that scales with distance as it tracks the user's movement in the three-dimensional (3D) environment viewable by the user in the AR interface. In some embodiments, the active reticle is configured to indicate to the user whether the user is viewing a vertical plane, ground plane, or ceiling plane. In some embodiments, the active reticle becomes smaller as the user lifts the electronic device from a downward position (e.g., pointing the electronic device at the floor) in an upward direction (e.g., pointing the electronic device at a vertical wall). In some embodiments, a virtual vertical reference line extents perpendicularly from the active reticle. The virtual vertical reference line enables the user to measure segments in the floor plan that are behind objects otherwise obstructing the visibility of the active reticle from the user's perspective. In some embodiments, the object is in the vertical plane, ground plane, or ceiling plane. In some embodiments, the virtual vertical reference line extends is quasi-infinite. In some embodiments, the virtual vertical reference line taller than an object, such that it is visible to the user as the use measures the plane. Some of the major advantages of the vertical reference line include obviating the need for the user to move the object, and enabling the user to make more accurate measurements of the space, to the extent the object is immobile. In some embodiments, the active reticle has a design making it particularly suited to tracking movement of the user in the 3D environment. Non-limiting examples of a design of the active reticle include, but are not limited to, a circular shape comprising crosshairs, dots, posts, circles, scales, chevrons, or a combination thereof.

Floorplan Generation

A three-dimensional (3D) floorplan of a space is generated by the AR applications disclosed herein. An AR interface is configured to allow the user to view the space in a 3D environment, in real-time and using touch gestures and/or voice commands to initiate and complete segmental measurements around the perimeter of the floor of the space to generate a defined floorplan of the space. A floorplan is generated when the user indicates positions of corners of the floor space via the AR interface in reference to the fixed coordinate system. In some embodiments, the AR application prompts the user to indicate the positions of corners via the AR interface. In some embodiments, corners are automatically detected using corner detection methods. Non-limiting examples of corner detection methods include Harris operator (Harris feature detection), Shi and Tomasi, FAST, Level curve curvature, Hessian feature strength measures, and SUSAN. In some embodiments, the automatic corner detection allows the user to measuring the distance between corners that are automatically detected, thereby reducing user time to completion of the project. In other embodiments, the automatic corner detection facilitates making measurements, by enabling the measuring tools to "snap" to the detected corners. In some embodiments, a position is indicated by voice and/or touchscreen gesture. Once the user indicates all of the positions of corners of the floor space, a ground plane is detected. Thereafter, hit-testing or ray-casting against the detected ground plane is performed to define the positions of corners of the floor space in world coordinates within the fixed coordinate system, thereby generating a floorplan of the space. In some embodiments, the floorplan is positioned relative to compass North. In some embodiments, virtual quasi-infinite vertical planes are placed on each segment of the floorplan.

In some embodiments, the augmented reality (AR) applications disclosed herein enable the user to move positions of corners and/or segments of the floorplan. In some embodiments, a segment of the floorplan is the distance between two positions of corners, or points between positions of corners, indicated by the user. In some embodiments, a segment is represented by a measured line viewable by the user in the three-dimensional (3D) environment using the AR interface. One of the advantages of moving positions of corners and/or segments while generating a floorplan includes an improvement in accuracy of the measurements generated by about 1%. In addition, the user is able to measure small adjacent areas within the space, and/or to measure behind objects within the space, thereby improving accuracy of the measurements. In some embodiments the user moves the positions of corners and/or segments of the floorplan when the user hovers the active reticle over the position or segment to activate the position or segment. In further embodiments, the user moves the activated position or segment using voice or touch gesture. In some embodiments the touch gesture comprises a drag-and-drop motion, or a double click gesture.

In some embodiments, the AR applications disclosed herein enable the user to capture images or video throughout the session. In some embodiments, the images or video captured comprise the measurement lines and/or rendered objects drawn by the AR applications. In some embodiments, each image or video comprises world coordinates and/or an orientation of the camera relative to the fixed coordinate system (e.g., a transform matrix). Using the world coordinates and camera orientation, the images or videos taken during the session are placed in the three-dimensional (3D) model by the AR application enabling the user to see where that image or frame of a video was taken in the context of the 3D model. In some embodiments, measurements of the floorplan are exported as a tabulated list. In some embodiments, the tabulated list may be used to generate a materials list for a project involving the space. In some embodiments, the tabulated list comprises a JavaScript Object Notation (JSON) format. In some embodiments, the AR applications are configured to export measurements of the floorplan to a cloud back-end.

Ceiling Height Measurement

Ceiling height measurements of a space are generated by the augmented reality (AR) application disclosed herein. In some embodiments, virtual vertical walls of the space are detected by an AR application. Alternatively, and in preferred embodiments, the AR application is configured to allow the user to extend virtual vertical wall planes from a position of a corner in the floorplan via the AR interface. In some embodiments, the user extends the virtual vertical wall planes one at a time. In some embodiments, the AR application is configured to enable the user to activate a segment of a floorplan using an electronic device, such as the device disclosed herein. In some embodiments, the floorplan is complete, or at least partially complete. In some embodiments, the user activates the segment of a floorplan when the user hovers the active reticle over the segment, and selects the segment using voice or touch gesture. In some embodiments the touch gesture comprises a drag-and-drop motion or a double click. In some embodiments, the touch gesture comprises pressing a button on the screen of the electronic device configured for the purpose of generating ceiling height measurements. In further embodiments, the user extends the floor geometry in an upward motion when the user activates the segment using any one of the methods disclosed herein, and lifts the electronic device from a downward position in an upward direction. Ray-casting against previously placed quasi-infinite vertical planes enables the measurement of virtual vertical planes. Thereafter, the vertical wall planes are combined to provide a 3D model of the space that is more accurate than using the automatic wall detection method disclosed above. Once defined, the quasi infinite vertical planes are truncated, to generate virtual planes representing the walls in the space. Ray-casting against the virtual vertical planes and floor place enable generation of a virtual ceiling. In some embodiments, a floorplan, virtual wall planes, and virtual ceiling are assembled into a 3D model of the space. In some embodiments, the AR application assembles the 3D model. In some embodiments, a cloud back-end assembles the 3D model.

In some embodiments, images and/or videos are captured throughout the user's AR session. In some embodiments, the AR applications disclosed herein enable the user to capture images or video throughout the session. In some embodiments, the images or video captured comprise the measurement lines and/or rendered objects drawn by the AR application. In some embodiments, each image or video comprises world coordinates and/or an orientation of the camera relative to the fixed coordinate system, or a transform matrix. Using the world coordinates and camera orientation, the images or videos taken during the session are placed in the three-dimensional (3D) model enabling the user to see where that image or frame of a video was taken in the context of the 3D model. In some embodiments, the augmented reality (AR) application is configured to place the image or frame of a video in the context of the 3D model. In another embodiment, the cloud back-end is configured to place the image or frame of a video in the context of the 3D model.

In some embodiments, the AR applications disclosed herein enable the user to annotate positions within the 3D model of the space. An AR application is configured to allow the user to annotate positions in real-time, as the floorplan, and/or 3D model is generated. In further embodiments, the annotations comprise a name for the element, e.g., "North Wall," "East Window," "Microwave," etc. In still further embodiments, the annotations comprise one or more measurements, one or more positions, or other notes for the element. In some embodiments, the annotations are derived from the compass and GPS positioning features of a mobile device to label wall placements and direction automatically. In another particular embodiment, the annotations are derived from computer vision and machine learning algorithms acting on a live camera data to label objects, fixtures, appliances, and the like in the space automatically. In yet another particular embodiment, the annotations are derived from speech recognition algorithms and natural language processing algorithms acting on voice input from a user to label features of the space. In some embodiments, at least some of the annotations are created as each measurement of the space is made. In other embodiments, at least some of the annotations are created after the measurements of the space are made and applied to a floorplan or a 3D model of the space.

In some embodiments, the measurements of the floorplan, ceiling and/or walls, and images and/or videos captured during the session are exported to a cloud back-end. In some embodiments, the measurements of the floorplan, ceiling, and/or walls are exported as a tabulated list. In some embodiments, the tabulated list may be used to generate a materials list for a project involving the space. In some embodiments, the tabulated list comprises a JavaScript Object Notation (JSON) format, such as the JSON format disclosed herein. In some embodiments, the AR application is configured to export measurements of the floorplan, ceiling and/or walls, and/or images or videos taken during the session, to a cloud back-end.

Rendering of Openings and Walls

The augmented reality (AR) applications are configured to enable the user to indicate segments of the floorplans that represent an opening in the space. Non-limiting examples of openings include a door. In some embodiments, the user indicates that a segment represents an opening using the augmented reality (AR) interface displayed to the user on the electronic device. In some embodiments, the user indicates that a segment represents an opening using voice or touch gesture. In some embodiments, the user points the device in a downward direction and hovers the active reticle over a segment of the floorplan, thereby activating the segment. Next, the user indicates using voice or touch gesture that the segment represents an opening such as a door. Alternatively, the user indicates using voice or touch gesture that the segment represents a wall. Once identified as a door, other opening, or wall, the user extends the geometry of the segment in an upward direction, thereby lifting virtual vertical boundaries of the opening or wall. In some embodiments, the boundaries are represented by measurement lines, with annotations comprising units of measurement. Next, a rendering of the opening or wall is created. In some embodiments, the AR application assembles the rendering of the opening or wall into the three-dimensional (3D) model of the space. In some embodiments, the cloud back-end assembles the rendering of the opening or wall into the 3D model of the space. In some embodiments the touch gesture comprises a drag-and-drop motion, or a double click gesture. In some embodiments, the touch gesture comprises pressing or holding a button on the screen of the electronic device configured for the purpose of identifying the segment as an opening, or generating virtual vertical boundaries. In some embodiments, when the user holds the button, the user recognizes the button is selected by haptic sensation such as a vibration, emitted from the electronic device. In some embodiments, openings are automatically rendered based on edges of openings that are automatically detected using edge detection methods. Non-limiting examples of edge detection methods include Canny, Deriche, Differential, Sobel, Prewitt, and Roberts cross. In some embodiments, the openings and walls are positioned relative to compass North.

The AR applications are further configured to enable the user to label the segment. In some embodiments, the label comprises text, an image of the 2D image plane, and/or video of the 2D image plane. In some embodiments, the AR application enables the user to capture images or video throughout the AR session. In some embodiments, the images and/or videos captured comprise data or metadata. In some embodiments, the data comprises measurement lines and/or rendered objects and/or openings drawn by the AR application. In some embodiments, metadata include date stamp information and/or location information of the images and/or videos when the images and/or videos were taken, information about the data including labels describing the objects, openings, and/or space. In some embodiments, the location information comprises global positioning satellite (GPS) coordinates. In some embodiments, each image or video comprises world coordinates and/or an orientation of the camera relative to the fixed coordinate system, or a transform matrix. Using the world coordinates and camera orientation, the images or videos taken during the session are placed in the three-dimensional (3D) model by the augmented reality (AR) application or the cloud back-end, thereby enabling the user to see where that image or frame of a video was taken in the context of the 3D model.

Object Rendering

Objects in the space are rendered by the AR applications disclosed herein. Non-limiting examples of objects comprise cabinets, counters, island counters, permanent fixtures, doors, windows, wall openings, electrical outlets, vents, ducts, appliances, and damage in the space. In some embodiments, the objects are objects in the floor plane, wall plane and/or ceiling plane. In some embodiments, the object is rendered when the user indicates a position of a corner of the object and a measurement line extending in an orthogonal direction appearing in the 3D environment of the AR interface connects the position to a second position, and so forth, until the entire object is outlined. In another embodiment, the object is rendered when the user indicates a position of a corner of the object, and a shape appearing in the 3D environment of the AR interface, is placed around the object by the user. In preferred embodiments, the shape comprises a rectangle or square. Other non-limiting examples of shapes that may be used to render objects according to the present embodiments include circles, ovals, ellipse, parallelogram, trapezoid, triangle, rhombus, pentagon, hexagon, heptagon, octagon, nonagon, and decagon. In some embodiments, the shape comprises measurement lines. In some embodiments, the measurement lines comprise annotated distance measurements. In some embodiments, the position of the object to be rendered indicated by the user comprises the top-left corner of the object. The shape becomes larger as the user moves the electronic device in a downward diagonal direction (e.g., from the top-left corner of the object toward the bottom-right corner of the object). In some embodiments, the shape is aligned with gravity such that the horizontal lines of the shape are parallel with the floorplan, or gravity vector. In some embodiments, objects are automatically rendered based on edges of objects that are automatically detected using edge detection methods. Non-limiting examples of edge detection methods include Canny, Deriche, Differential, Sobel, Prewitt, and Roberts cross. In some embodiments the object(s) are positioned relative to compass North.

In some embodiments, are methods of extending the geometry of an object in an outward direction from the plane in which the object sits using voice or touch gestures. In some embodiments, the object sits in the floor plane, and the geometry of the object is extended in an upward direction. In some embodiments, the object in the floor plane comprises a permanent fixture, or a semi-permanent fixture. Non-limiting examples of permanent fixtures comprises an island and a counter. Non-limiting examples of a semi-permanent fixture comprises an appliance, such as a refrigerator, swamp cooler, and water heater. In some embodiments the touch gesture comprises a drag-and-drop motion, or a double click gesture. In some embodiments, the touch gesture comprises pressing or holding a button on the screen of the electronic device configured for the purpose of extending the geometry of an object. In some embodiments, when the user holds the button, the user recognizes the button is selected by haptic sensation such as a vibration, emitted from the electronic device.

In some embodiments, the augmented reality (AR) applications disclosed herein are configured to enable the user to identify a segment as an object, and automatically define the object in the three-dimensional (3D) environment by a predetermined dimensions or characteristics. In some embodiments, the virtual wall is displaced when the object is generated. Displacement of the virtual wall according to the present embodiment enables the user to measure segments within a floorplan otherwise hidden by the object, thereby increasing accuracy of the floorplan measurements. In some embodiments, the object is difficult, or impossible, to move. Non-limiting examples of objects include cabinets, a water heater, a heating and cooling unit, toilets, shower and/or bath tub units, and counters. In further embodiments, the object is assigned predetermined dimensions commonly used for the object. In some embodiments, common predetermined dimensions of an object are defined, at least in part, based on geographical location, and/or the space in which the object exists. For example, the dimensions in the United States (a geographical location) for kitchen (a space) cabinets (objects) are generally 34 inches high and 24 inches deep. In a non-limiting example of the present embodiment, the user in the United States indicates a segment in the floorplan as being a cabinet using voice or touch gesture as disclosed herein. Next, the AR application generates a rendering of kitchen cabinets, each cabinet defined by predetermined dimensions 34 inches high and 24 inches deep, consistent with the commonly used dimensions of kitchen cabinets in the US.

In some embodiments, the AR applications are configured to enable the user to label the object. The label may comprise text, an image, and/or video taken by the user during the AR session. In some embodiments, the AR applications enable the user to capture images or video throughout the session of the space comprising the object. In some embodiments, the images or video captured comprise the measurement lines and/or rendered objects drawn by the AR applications. In some embodiments, each image or video comprises world coordinates and/or an orientation of the camera relative to the fixed coordinate system (a transform matrix). Using the world coordinates and camera orientation, the images or videos taken during the session are placed in the three-dimensional (3D) model by the AR applications enabling the user to see where that image or frame of a video was taken in the context of the 3D model.

Assembling the Three-Dimensional (3D) Model

Still referring to FIG. 29, the augmented reality (AR) applications are configured to assemble data generated from the AR session, package the data in a format that is compatible with a cloud-back end, and transmit the data via a network application programming interface (API), 215. In some embodiments, data comprises a floorplan, a 3D model of a space, object rendering(s), rendering(s) of openings, renderings of walls, and/or images and/or videos taken throughout the session. Images, videos, and/or frames of a video taken by the user during the AR session may be incorporated into the 3D model by an AR application by way of an icon. In some embodiments, placement of the icons in the 3D model provides context to the user of where the image, video, and/or frame was taken during the AR session using the world coordinates and camera orientation data. In some embodiments, an AR application to configured to enable the user to activate the icon by voice and/or touch gesture to view the image, video and/or frame. In some embodiments, the data format comprises a JavaScript Object Notation (JSON). In some embodiments, the API is fault tolerant. In some embodiments, the API is a representation state transfer (REST) API.

The cloud back-end (e.g., cloud portal), 220, is configured as the API EndPoint to receive the data from the AR session via a cloud-based network. In some embodiments, the cloud back-end receives the 3D model that was generated locally on the electronic device by the AR application. In some embodiments, the cloud back-end is configured to assemble the floorplan, the virtual walls and virtual ceilings to generate the 3D model. In such a case, the cloud-back-end is configured to incorporate images, videos and/or frame(s) of a video into the three-dimensional (3D) model of the space. In some embodiments, the images, videos and/or frame(s) of a video are incorporated by way of an icon. In some embodiments, placement of the icons in the 3D model provides context to the user of where the image, video, and/or frame was taken during the AR session using the world coordinates and camera orientation data. In some embodiments, an AR application is configured to enable the user to activate the icon by voice and/or touch gesture to view the image, video and/or frame. In some embodiments, the cloud portal is configured to assemble the floorplan, the virtual walls, virtual ceilings, object renderings, renderings of openings, renderings of walls, and/or images and/or videos taken throughout the session into a 3D model.

In some embodiments, the cloud portal is configured to perform object detection in the 3D model of the space. In some embodiments, object detection is performed by combining an object detection framework with the augmented reality (AR) data generated during an AR session. Non-limiting examples of object detection frameworks include neutral networks, convolutional neural networks, deep learning algorithms (e.g., CAFFE) and object detection algorithms (Teknomo-Fernandez algorithm, Viola-Jones object detection framework). In some embodiments, the object detection framework leverages the data generated using the AR application to detect scale of the object in the space. In further embodiments, the object detection framework is configured to recognize objects common in the space type and/or region or location of the space. In a non-limiting example, a user generates a 3D model of his child's play room. An object in the playroom is a toy horse. Ordinarily, an object detection framework would classify the object as a "horse," with limited concept of scale and context. The cloud-portal performs object detection using the 3D model generated by the AR application in combination with an object recognition framework configured to detect objects in a play room. Accordingly, the object is assigned, "horse," the scale of the horse is calculated relative to the dimensions of another object in the 3D model (e.g., a bed, or cabinet), and the location (e.g., play room) is used to further classify the "horse" as a "toy." Accordingly, objects rendered locally by the AR application, or remotely by the cloud portal, are additionally, recognized in the 3D model in accordance with the present embodiment.

Reusing the Three-Dimensional (3D) Model

In some embodiments, the 3D model that is generated using the methods, systems, devices, and media disclosed herein, is reusable. The 3D model is reusable in a variety of ways within the augmented reality (AR) application. In a non-limiting example, the 3D model is loaded, or reloaded, into the AR application to create, or recreate, a virtual model of the space in alignment with real-world floors, walls, doors, openings, and/or ceilings. In this example, the 3D model is used to display virtual objects and provide and interactive user experience. In some embodiments, the 3D model is stored either on the device or downloaded from a server and regenerated and re-aligned as needed once the user is back in the captured space and/or enters a new space where they want to visualize the original model. In some embodiments, the reused 3D model is used to visualized a redesigned room. In other embodiments, the reused 3D model is used to test out the placement and fit of commercial, or non-commercial, objects prior to an end user acquiring them. In still other embodiments, the reused 3D model is used to provide daily spatial context of a building or room. In some embodiments, the 3D model is configured to allow users to add elements and receive interactive recommendations from third-party sources. Non-limiting examples of elements include reminders, and/or notes. In some embodiments, the re-used 3D model is the basis for a gaming platform that allows AR with vertical objects or openings, such as those disclosed herein. In some embodiments, the 3D model is configured to be viewed in an interactive user experience via any device suitable for viewing and interacting with the 3D model in an AR environment.

Cloud Portal

The AR applications disclosed herein are configured to prompt a user to create a user account profile. Once the user account profile is complete, the user is prompted by the AR applications to describe the project the user wishes to view in the cloud portal. Next, the data is transmitted by the AR applications to the cloud portal via a custom API. In some embodiments, the cloud portal is configured to be the API EndPoint that receives the data. In various embodiments, the cloud portal configured to receive the data generated during the user's AR session is associated with the account of the user, the account of a recipient (e.g., insurance provider, landlord, prospective home buyer, or design professional), or a third party account. In some embodiments, a third party is an intermediate company employed to share limited amounts of user data with a recipient in situations when user privacy is paramount.

The cloud portal is configured to provide a user via a user interface with a report comprising information related to the project. Non-limiting examples of information related to the project comprise a summary of the measurement data generated, the name of the user, location of the project, a three-dimensional (3D) model viewer, and a viewer for images, videos and/or frames of a video taken by the user during the augmented reality (AR) session. In some embodiments, the information related to the project is organized in modules that are configured to be individually collapsed and/or downloaded. Non-limiting examples of information provided to the user with the 3D model viewer include a 3D model of space, interactive measurements for each segment, plane, opening, and/or object, and icons representing images, videos, or frames of a video taken by the user during the AR session. In some embodiments, the measurements and/or icons are hidden, for a simplified viewing experience. The user interface enables the user to view the 3D model from a variety of viewing angles and/or measurement data for each plane, object, or opening, in the 3D model using voice and/or touch gesture. In some embodiments, touch gesture comprises touchscreen gesture, keyboard, mouse, or other gesture. Any suitable form of touch gesture may be implemented in the cloud portal for this purpose. Non-limiting examples of measurement data displayed to the user include the area, length, width, height, and perimeter of the space.

In some embodiments, the cloud portal is configured to assemble the uploaded data and transmit it via a computer network and an API to an alternate cloud platform using a data transmission system. In some embodiments, the data transmission system consists of data bundled in JSON format and transmitted via REST API. In some embodiments, the alternate cloud platform is a secondary cloud node within the original host network and/or a cloud node completely unaffiliated with the original network. In some embodiments, the original host network may be bypassed altogether and the data may be sent directly from the AR application to the alternate unaffiliated cloud node using. In some embodiments, the data is JSON encoded data, which is transmitted via REST API. In some embodiments, the alternate cloud node has the same rendering and analysis capabilities as the original cloud node. In some embodiments, the alternate cloud node does not have the same rendering analysis capabilities as the original cloud node. In further embodiments, the alternate cloud node is configured to repackage the data for subsequent use or further retransmission to yet other alternate cloud nodes. In a non-limiting example of a case in which security is of prime importance, the data is transmitted from the AR application to an alternate secure cloud node and the original cloud node can be accessed via API to help process the data without it ever leaving the secure environment.

In some embodiments, the position of the 3D model is relative to compass North. For example, the 3D model viewer convey to the user whether the wall plane is the West wall, or East wall, relative to compass North. In some embodiments, two or more 3D models of two or more different spaces may be combined in the cloud portal. In some embodiments, the two or more 3D models are combined by lining up adjacent wall planes based on their position relative to compass North. In a non-limiting example, a user generates a 3D model of a bathroom using the AR application disclosed herein for purposes of a bathroom remodel, and thereafter decides she needs to expand the bathroom into the master bedroom to accommodate a double sink vanity. She next generates a 3D of the master bedroom using the AR application disclosed herein. To combine the 3D model of the bathroom with the 3D model of the master bedroom, the AR application exports the data from both AR sessions in a format compatible with the cloud portal. The cloud portal receives the data, and displays both three-dimensional (3D) models relative to compass North. The user next indicates to the cloud portal via the user interface to combine the 3D model of the bathroom and the 3D model of the master bedroom, by lining up the East and West wall planes of the 3D models, respectively.

In some embodiments, the user the report comprising information related to the project is viewed by the user via a user interface, downloaded from the cloud portal, and/or shared with a recipient. Non-limiting examples of recipients include insurance provider, prospective home buyer, landlord, prospective tenant, design professional, architect, contractor, and a government entity. In a non-limiting example, a user generates a 3D model using the augmented reality (AR) applications disclosed herein of their home that was recently damaged by a natural disaster, including images of the damage taking during the AR session to submit a claim to an insurance provider. In this example, the images comprise metadata including the GPS coordinates and time stamp for every image taken during the AR session, thereby authenticating the user's claim. The AR applications convert all of the data and metadata generated during the AR session into a JSON format suitable for transmitting the data and metadata to the cloud portal. From the cloud portal, the user views a report comprising the data (e.g., 3D model and images) and metadata (e.g., timestamp and GPS coordinates) on the cloud portal. The user shares the report to the insurance provider via a computer network. In addition, the user downloads the report for his or her records, and/or shares the report by printing the report and providing a copy of the report to an insurance adjuster.

Electronic Device

In various embodiments, the subject matter described herein include an electronic device, or use of the same. In further embodiments, the electronic device includes one or more hardware central processing units (CPU) that carry out the device's functions. In still further embodiments, the electronic device further comprises an operating system configured to perform executable instructions. In some embodiments, the electronic device is optionally connected a computer network. In further embodiments, the electronic device is optionally connected to the Internet such that it accesses the World Wide Web. In still further embodiments, the electronic device is optionally connected to a cloud computing infrastructure. In other embodiments, the electronic device is optionally connected to an intranet. In other embodiments, the electronic device is optionally connected to a data storage device.

In accordance with the description herein, suitable electronic devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, and video game consoles. Many smartphones are suitable for use in the system described herein. Select televisions, video players, and digital music players with optional computer network connectivity are suitable for use in the system described herein. Suitable tablet computers include those with booklet, slate, and convertible configurations.

In some embodiments, the electronic device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the computing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the electronic device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the electronic device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

Disclosed herein are one or more non-transitory computer readable storage media encoded with the computer program client code, including instructions executable by at least one processor of an electronic device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Systems

Aspects disclosed herein provide systems for generating a three-dimensional (3D) model of a space using an augmented reality (AR) application, comprising: (a) an electronic device, optionally connected to a computer network; and (b) a software module executed by the electronic device to perform the steps of i) receiving, from a resource of the electronic device, the position and orientation of the electronic device in reference to a fixed coordinate system; ii) receiving, from the resource of the electronic device, the position and orientation of a ground plane in a space in reference to the fixed coordinate system; iii) providing an augmented reality (AR) interface for identifying positions of corners of a floor of the space; iv) receiving, from a user via the augmented reality (AR) interface, indications of the positions of the corners of the floor in reference to the fixed coordinate system, wherein the application is configured to project a reference point on the screen into a ray in world coordinates and determine an intersection point with the ground plane via hit-testing thus detecting the corners of the floor of the space; v) assembling the detected corners into a floorplan of the space, wherein each corner of the detected corners is connected with a measured line comprising distance annotations; vi) generating virtual quasi-infinite vertical planes extending from each corner of the detected corners representing virtual walls of the space; vii) receiving, from the user via the AR interface, indications of intersection points between the ceiling and the virtual walls (ceiling intersections) using the reference point on the screen, wherein each of the ceiling intersections is connected with a measured line comprising distance annotations; viii) truncating the virtual walls to reflect the ceiling height in the space; ix) receiving, from a user via the augmented reality (AR) interface, indications of segments of the vertical planes representing openings; and x) assembling the floorplan, the truncated virtual walls, virtual ceiling into a three-dimensional (3D) model of the space in world coordinates. In some embodiments, the resource of the electronic device comprises a software development kit (SDK) as disclosed herein.

In some embodiments, the AR interface comprises an active reticle configured to scale with distance that (i) enables the user to provide the software module with indications and (ii) indicates whether the user is viewing the vertical plane, the virtual floor, or the virtual ceiling. In some embodiments, indications received by the device from the user via the AR interface comprise touchscreen gestures or voice commands recognized by the software module. In some embodiments, the opening comprises a door, a window, a duct, a vent, or electrical outlet, or any combination thereof. In some embodiments, the AR interface is further configured to allow the user to move or adjust the positions of the corners of the floor, intersection points between the ceiling and the virtual walls, and/or the segments thereby reducing drift error.

In some embodiments, the software module is further configured to: i) identify corners of objects on the vertical walls, virtual floor, and/or virtual ceiling of the space; ii) receive, from the user via the AR interface, indications of the corners of the objects on the truncated virtual walls, virtual floor and/or virtual ceiling, wherein the software module projects a reference point on the screen into a ray in world coordinates and determines an intersection point with the virtual wall, virtual floor, and/or virtual ceiling, via hit-testing thus measuring the objects; iii) configure the corners indicated by the user into linear measurements, shapes, and positions representing the objects; and iv) superimpose the objects onto the truncated virtual walls, virtual floor, and/or virtual ceiling, of the floorplan of the space. In some embodiments, the shapes comprise squares, rectangles, polygons, circles, semi-circles, ovals, or curves. In some embodiments, the shapes represent doors, windows, wall openings, electrical outlets, vents, ducts, counters, island counters, cabinets, appliances, or damage in the space. In some embodiments, the software module is further configured to assemble the floorplan, the truncated virtual walls, virtual ceiling, and the objects into a three-dimensional (3D) model of the space in world coordinates. In some embodiments, the software module is further configured to export the floorplan, ceiling height measurements, and/or 3D model into the cloud back-end, and wherein the software module or the cloud back-end is configured to convert the floorplan, ceiling height measurements, and/or 3D model into one or more formats compatible with commercial design software. In some embodiments, the one or more formats comprises a tabulated list for subsequent use. In some embodiments, the tabulated list is used to generate a materials list for a project involving the space. In some embodiments, the tabulated list comprises a JSON format. In some embodiments, the software module is further configured to export still images or video of an augmented reality (AR) session recorded by the AR application at the AR interface. In some embodiments, the distance annotations are generated in a 2D image plane, and wherein the software module is further configured to map the distance annotations in 3D world coordinates to 2D image plane coordinates, thereby reducing the need to scale with distance.

In some instances, the system comprises a central processing unit (CPU), memory (e.g., random access memory, flash memory), electronic storage unit, computer program, communication interface to communicate with one or more other systems, and any combination thereof. In some instances, the system is coupled to a computer network, for example, the Internet, intranet, and/or extranet that is in communication with the Internet, a telecommunication, or data network. In some embodiments, the system comprises a storage unit to store data and information regarding any aspect of the methods described in this disclosure.

In some embodiments, the system comprises a cloud-back end (e.g., cloud portal). In some instances, the cloud back-end is configured as the API EndPoint, receiving data from the user's AR session from the AR application. In some embodiments, the electronic device is configured to communicate with the cloud back-end. Various aspects of the system are a product or article or manufacture.

EXAMPLES

The following illustrative examples are representative of embodiments of the subject matter described herein and are not meant to be limiting in any way.

Example 1—Generating a Floorplan and a Three-Dimensional (3D) Model of a Kitchen A user wants to create a digital representation of their kitchen to plan for a remodel project. The user initializes an augmented reality (AR) application on their smartphone and employs an AR interface of the application to view the space of the kitchen through the camera of their smartphone. The augmented reality (AR) application utilizes a resource of the smartphone to identify the position and orientation of the smartphone in reference to a fixed coordinate system as well as the orientation of the ground plane in the space in reference to the fixed coordinate system (calibration). Once calibration of the AR application is complete, an active reticle configured to scale with distance appears on the AR interface. Throughout the AR session, the user hovers the active reticle over various positions and/or segments in the floorplan and activates the positions and/or segments by interacting with the AR interface using voice and/or touch gesture.

Figure 2:
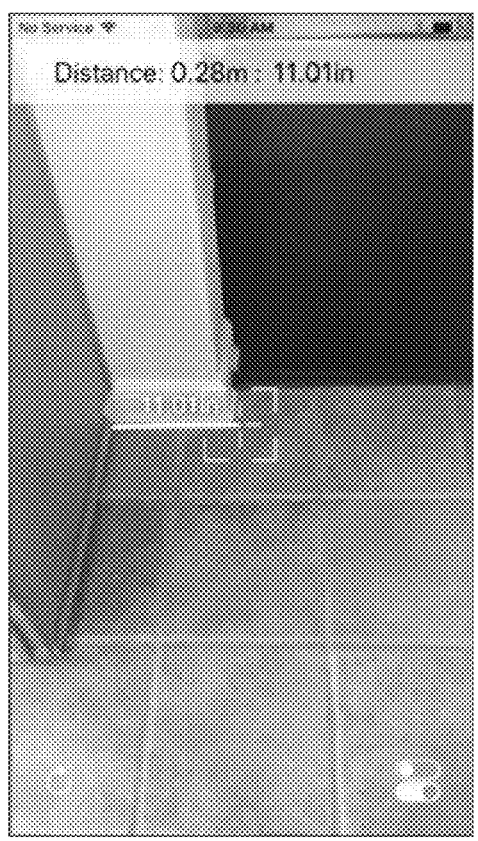
FIGS. 2-9 exemplifies a user interface; in this case, an AR interface for making measurements of a space, wherein a user is making segmental measurements around the perimeter of the floor, forming a closed loop, of the space.
Figure 3:
Figure 4:
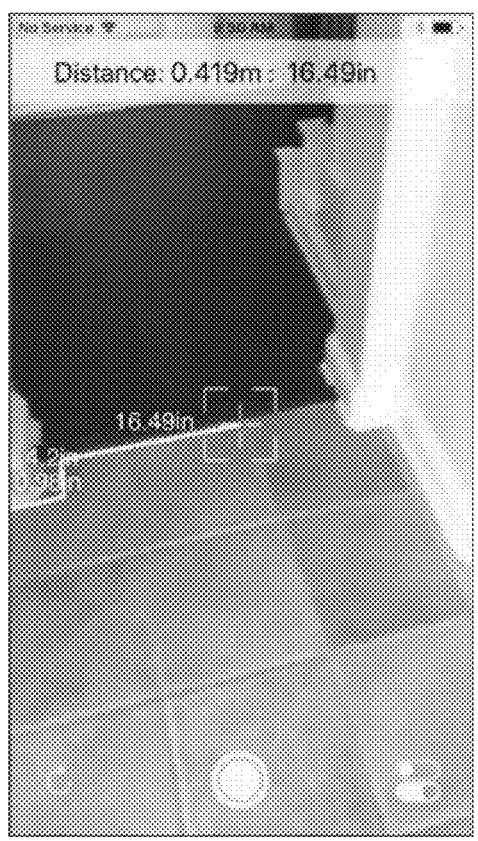
Figure 5:
Figure 6:
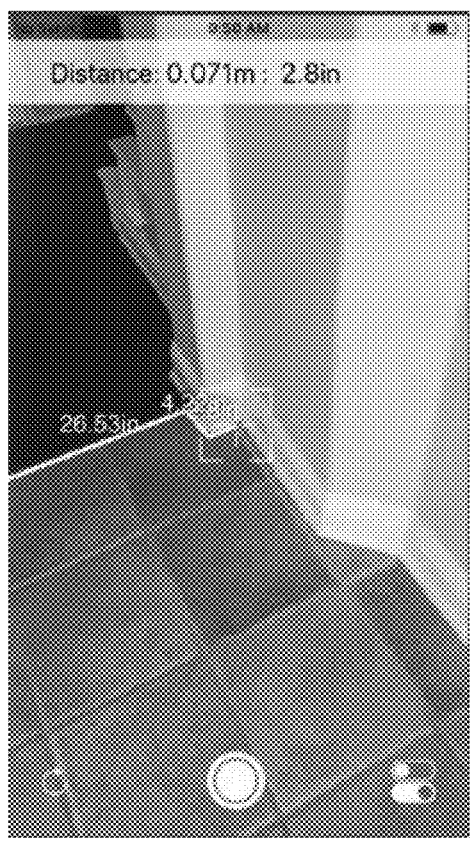
Figure 7:
Figure 8:
Figure 9:
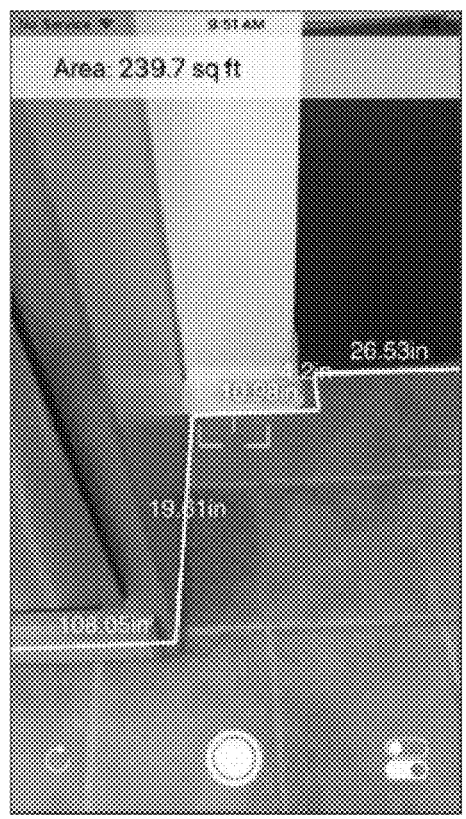

The user marks a first corner of a kitchen floor using a touchscreen gesture to indicate when a crosshairs sight in the AR interface is over the first corner (see FIG. 2). The user does not have to place rulers or fiducial markers into the space. The user proceeds to work around the perimeter of the floor, interacting with the AR interface via touch gestures to start and end a series of linear segmental measurements, linearly from corner to corner, that form a closed loop around the outer edge of the floor (see FIGS. 3-9). The length of each linear measurement is displayed in the AR interface. Once the closed loop around the outer edge of the floor is formed, the application calculates and displays the area of the floor of the kitchen space (see FIG. 9).

Figure 10:
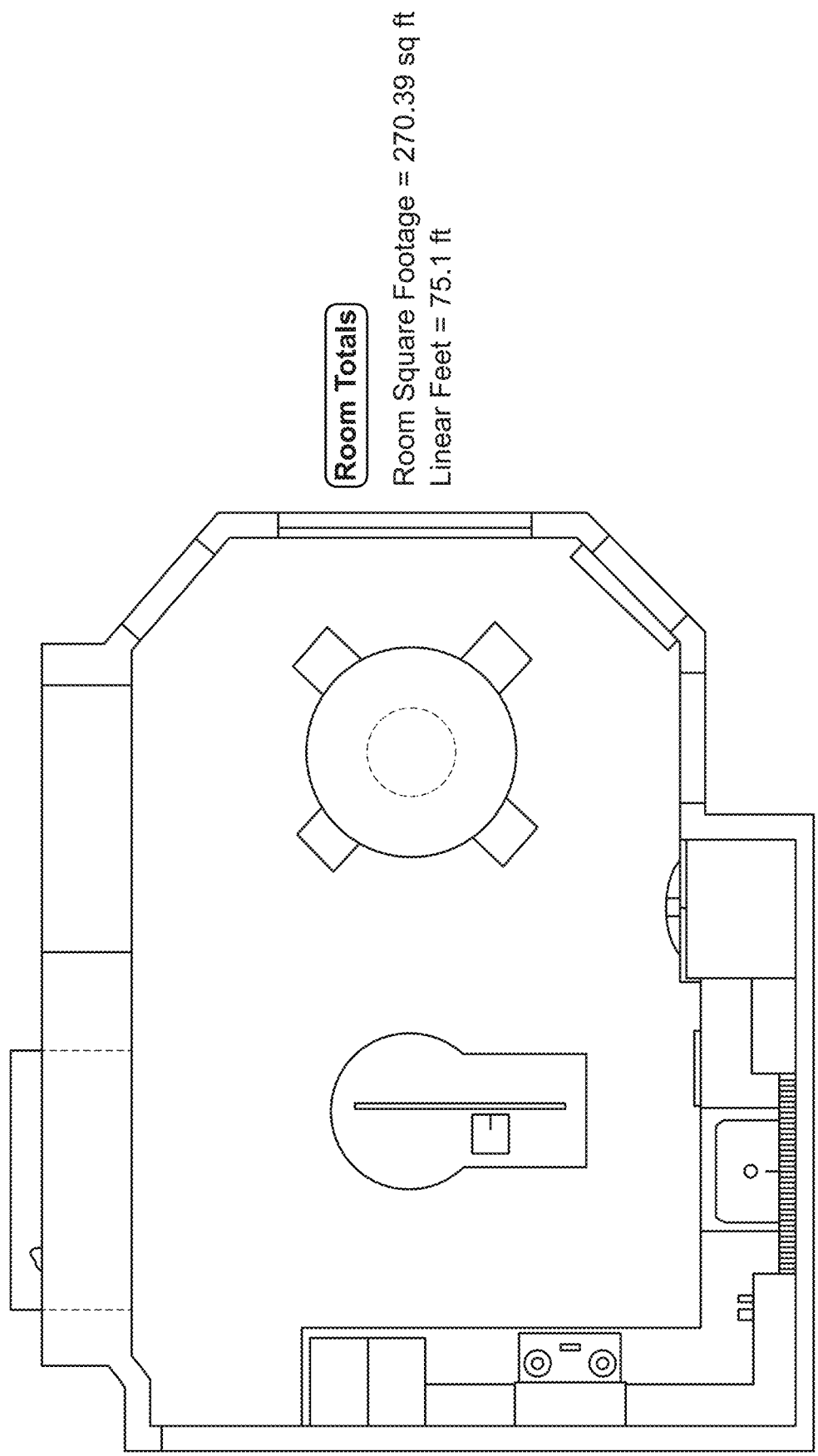
FIG. 10 exemplifies a floorplan; in this case, a floorplan generated based on measurements of a space made via an AR interface.

Using the measurements, the application generates a floorplan of the space, which is displayed on the screen of the smartphone (see FIG. 10). The floorplan includes the square footage of the space as well as the linear feet of floorboard measured.

The floorplan is extended vertically to create infinite vertical planes representing walls. Next, the user activates a linear segment of the floorplan, and interacts with the AR interface of the application by voice or touch gesture to measure floor-to-ceiling height by extending vertical planes from the floorplan. In a non-limiting example of ways the user interacts with the AR interface to measure the floor-to-ceiling height, the user hovers over a linear segment with the active reticle, and clicks on a touchscreen button on the electronic device, thereby activating the segment. Next, the user lifts the phone from a downward position (e.g., pointing towards the ground) in an upward motion (e.g., towards the vertical plane), thereby extending vertical planes in an upward direction from all linear segments of the floorplan. The application then truncates the virtual vertical walls to reflect the actual ceiling height in the space.

Figure 11:
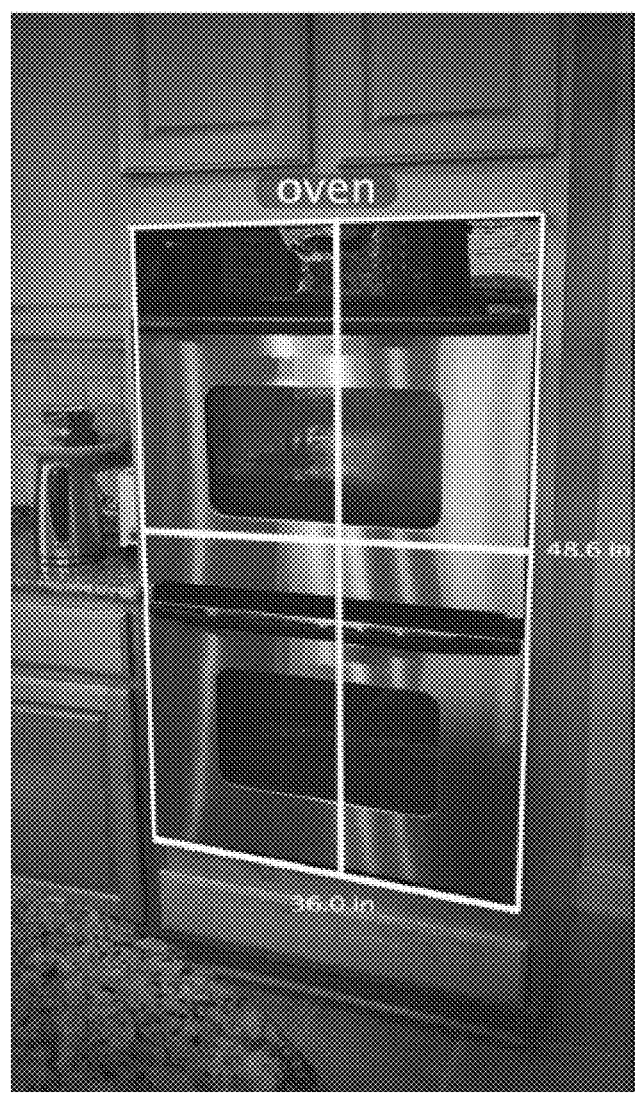
FIG. 11 exemplifies a user interface; in this case, an AR interface for making measurements of features within a space and labeling the features, wherein a user is making measurements of an oven in the space.
Figure 12:
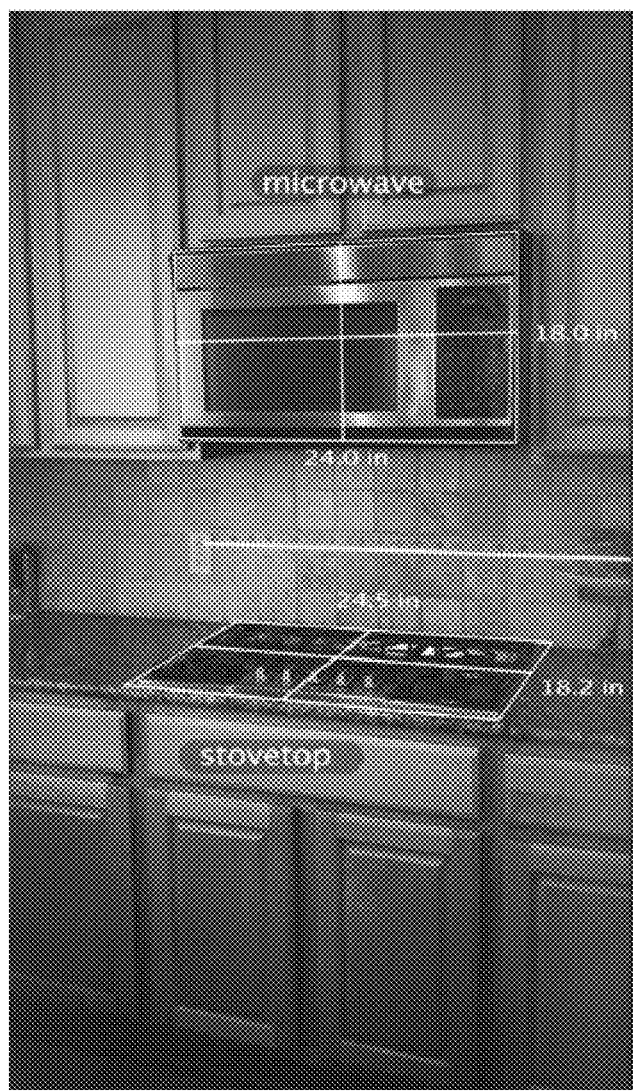
FIG. 12 exemplifies a user interface; in this case, an AR interface for making measurements of features within a space and labeling the features, wherein a user is making measurements of a microwave, stovetop, and backsplash in the space.
Figure 13:
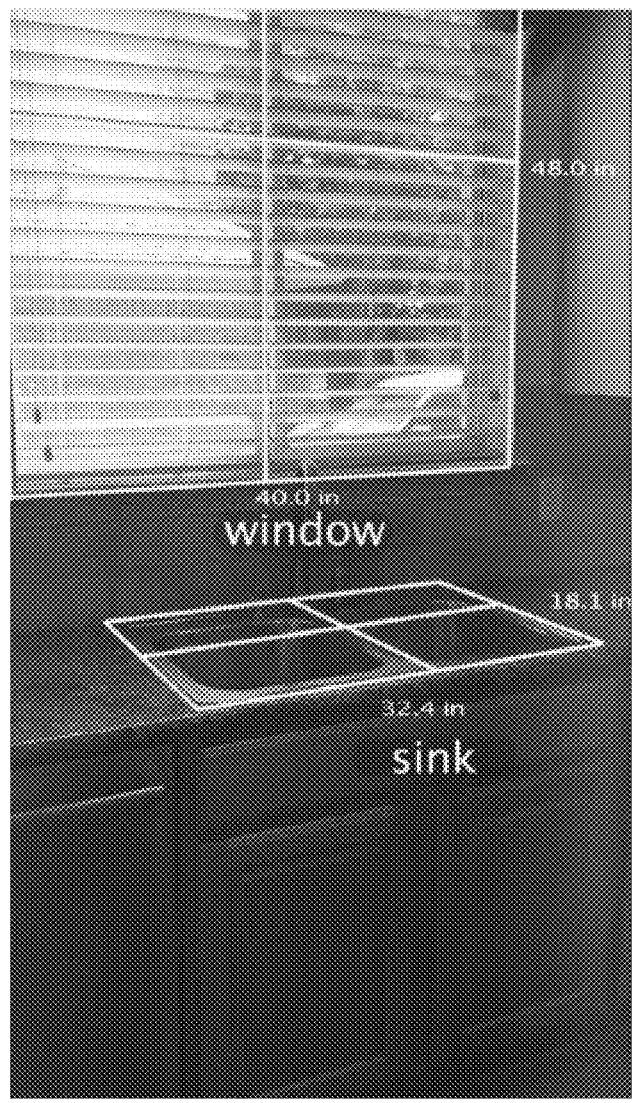
FIG. 13 exemplifies a user interface; in this case, an augmented reality (AR) interface for making measurements of features within a space and labeling the features, wherein a user is making measurements of a sink and sink window in the space.
Figure 14:
FIG. 14 exemplifies a user interface; in this case, an AR interface for making measurements of features within a space and labeling the features, wherein a user is making measurements of an refrigerator in the space.

Finally, the user employs the AR interface of the application to measure objects and features within the space, interacting with the interface via touchscreen gestures to start and end measurements, diagonally from corner to corner, on the vertical planes (e.g., virtual walls) of the space. The user indicates the placement of an oven (see FIG. 11), a microwave, a stovetop, and a backsplash (see FIG. 12), a sink and a sink window (see FIG. 13), as well as a refrigerator (see FIG. 14). Upon indicating the placement of each vertical object and feature within the space, the AR interface calculates and displays the dimensions of each object and feature by reference to the fixed coordinate system. Also, upon indicating the placement of each vertical object and feature within the space, the user manually tags each object and feature with an identifying annotation.

Figure 15:
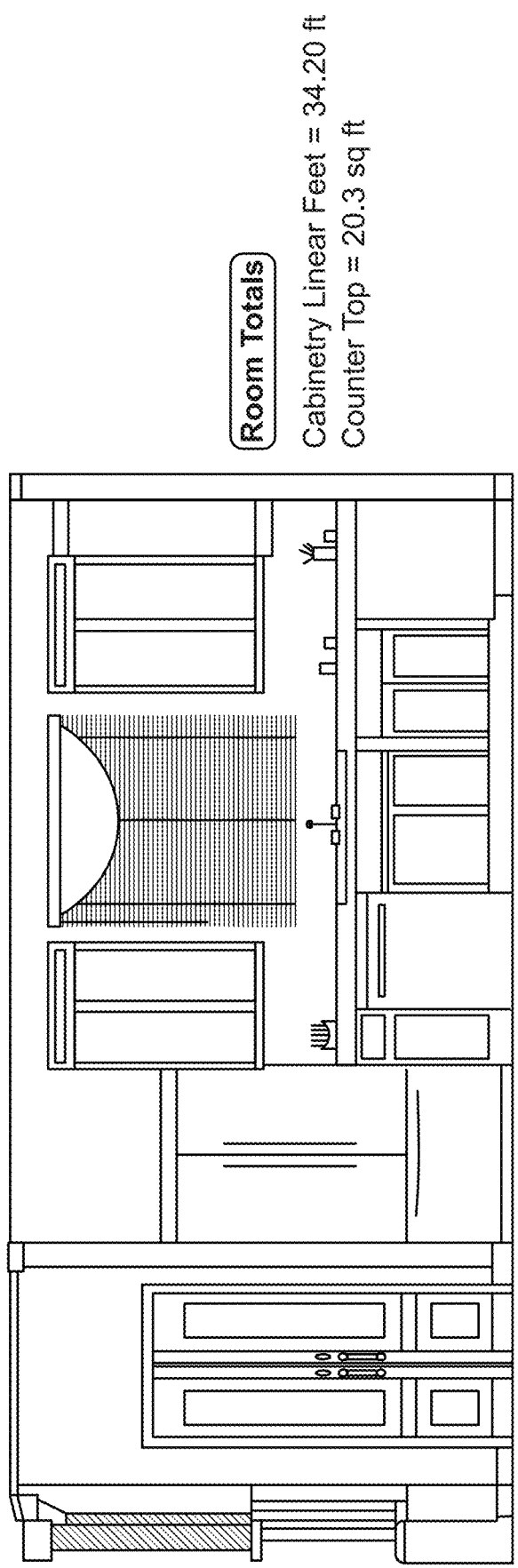
FIGS. 15 and 16 exemplify a three-dimensional (3D) room model; in this case, a 3D room model generated based on measurements of a space and of features within the space made via an AR interface and including room quantitative totals for linear feet of cabinetry, square feet of counter top, and wall square footage.
Figure 16:
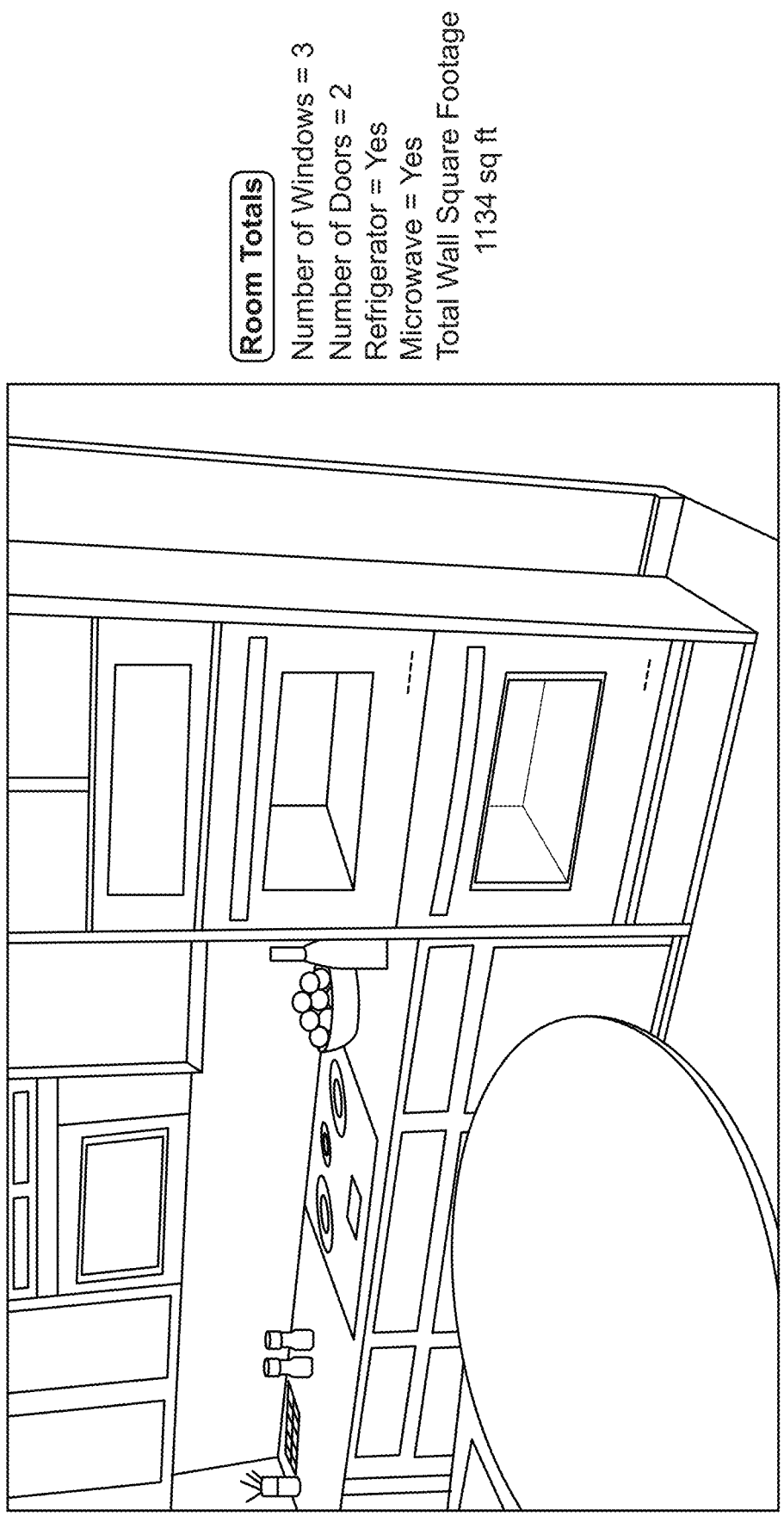

Using the floorplan, the ceiling height, and the measurements of the features/objects, the application generates a three-dimensional (3D) model of the space (see FIGS. 15 and 16), which is displayed on the screen of the smartphone. The 3D model includes calculated measurements of the linear feet of cabinetry and the square footage of counter top (see FIG. 15). The 3D model also includes calculated number of windows, number of doors, and wall square footage (see FIG. 16). The user decides to export the floorplan and the 3D model to construction management software to generate materials lists and construction schedules for their kitchen remodel project.

Example 2—Generating a Floorplan and a 3D Model of a Living Room

A user wants to create a digital representation of their living room to plan for a painting project. The user initializes an augmented reality (AR) application on their smartphone and employs an AR interface of the application to view the space of the living room through the camera of their smartphone. The AR application utilizes a resource of the smartphone to identify the position and orientation of the smartphone in reference to a fixed coordinate system as well as the orientation of the ground plane in the space in reference to the fixed coordinate system.

Figure 17:
FIGS. 17-19 exemplify a user interface; in this case, an AR interface for making measurements of a space, wherein a user is making segmental measurements around the perimeter of the floor, forming a closed loop, of the space.
Figure 18:
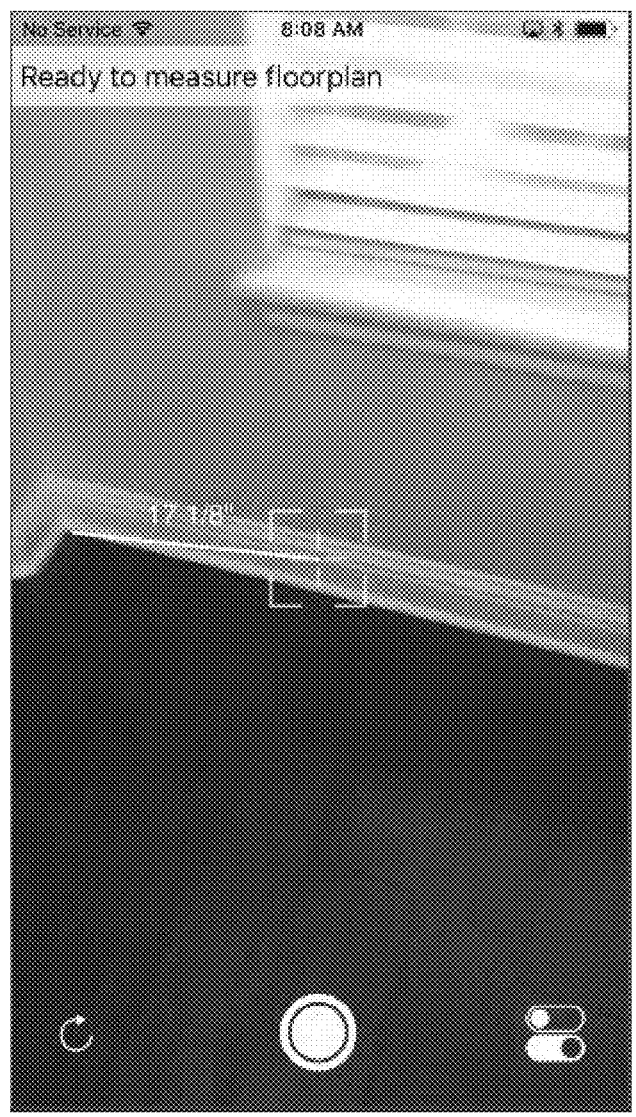
Figure 19:
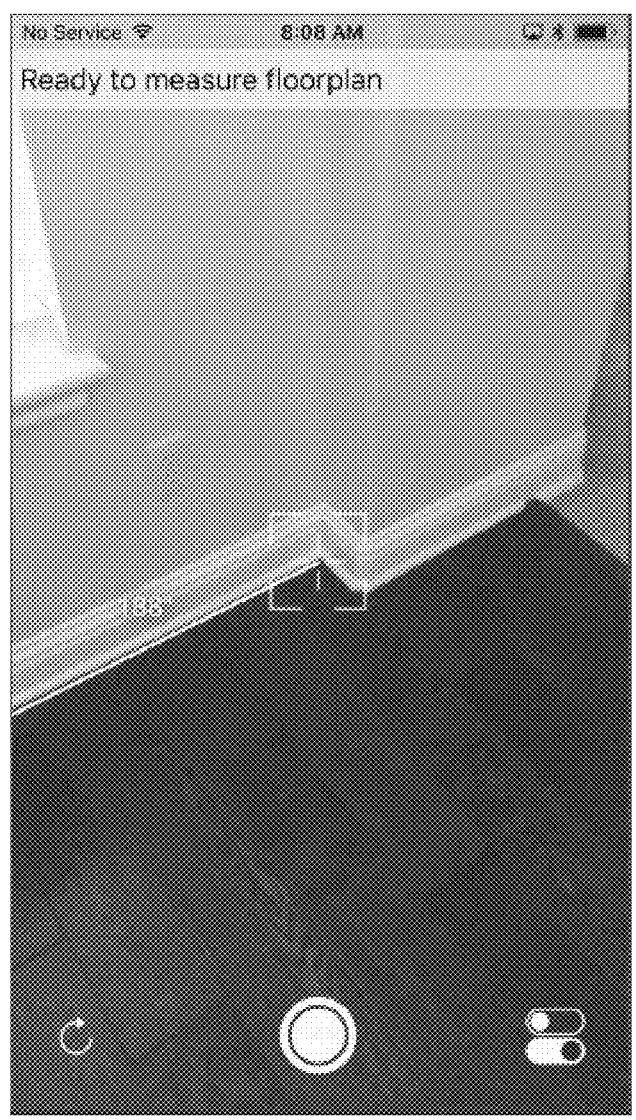

The user marks a first corner of a living room floor using a voice command, which is recognized by a speech recognition algorithm of the application, to indicate when the reticle in the AR interface is over the first corner (see FIG. 17). The user does not have to place rulers or fiducial markers into the space. The user marks additional corners around the perimeter of the floor, interacting with the interface via voice commands to start and end a series of linear segmental measurements across a wall of the living room (see FIGS. 18 and 19). The length of each linear measurement is displayed in the AR interface.

Figure 20:
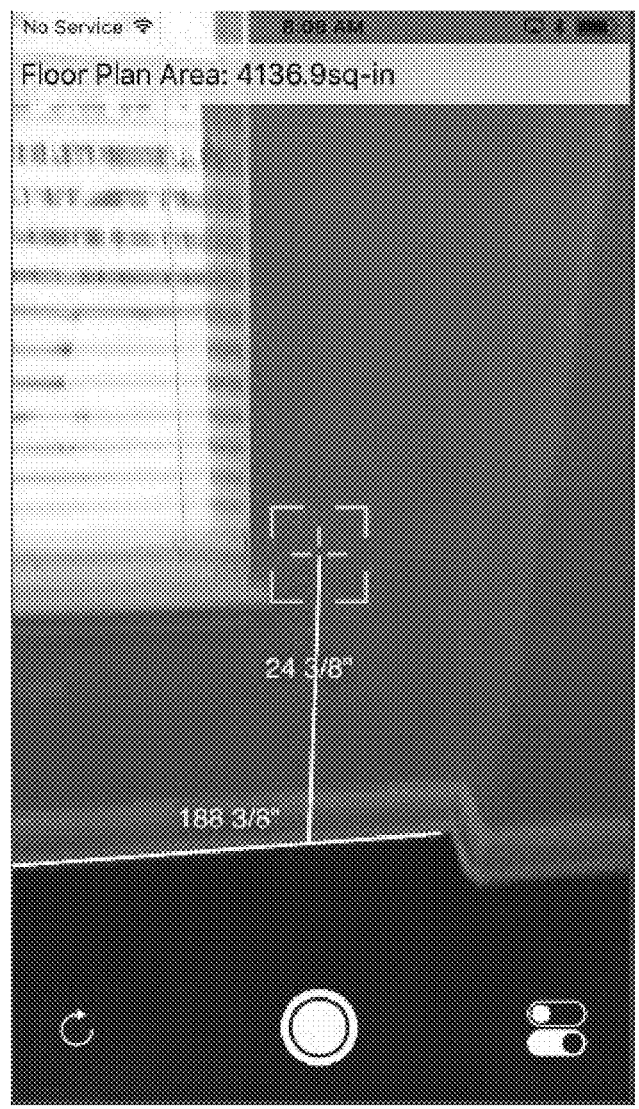
FIGS. 20 and 21 exemplify a user interface; in this case, an AR interface for making measurements of a space, wherein a user is making a segmental measurement of the floor-to-ceiling height of the space.
Figure 21:
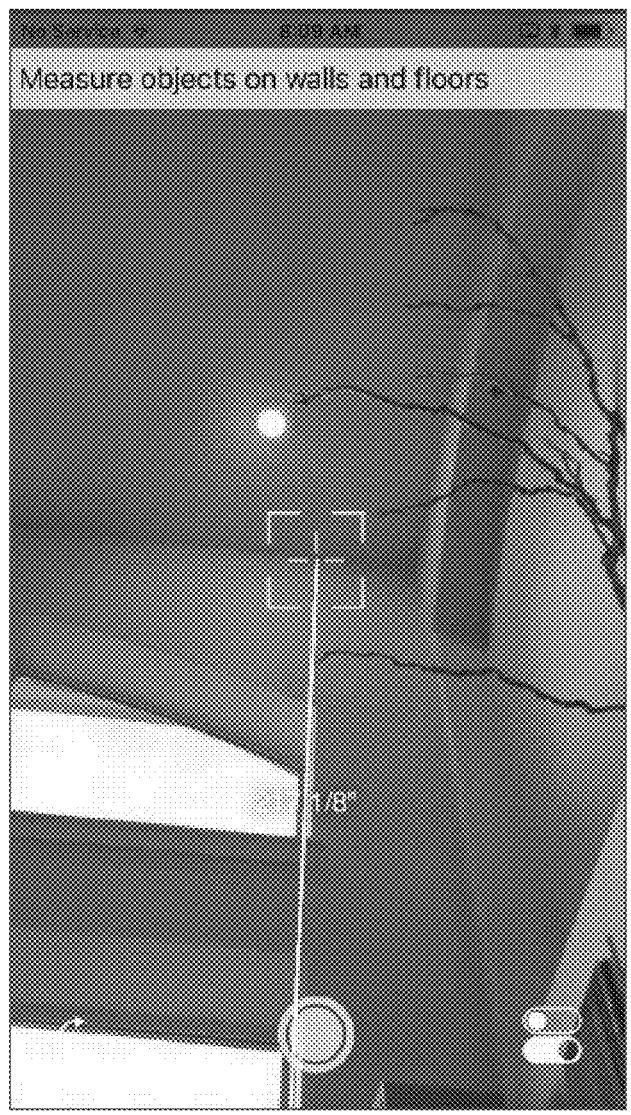
Figure 22:
FIGS. 22-25 exemplify a user interface; in this case, an AR interface for making measurements of features within a space and labeling the features, wherein a user is making measurements of windows in the space.
Figure 23:
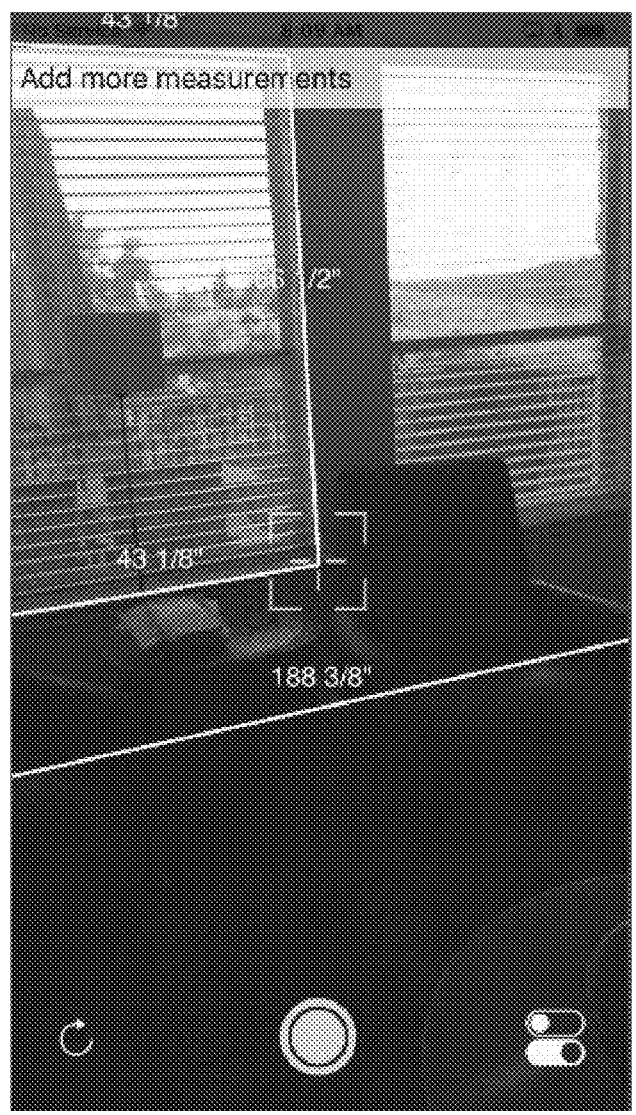
Figure 24:
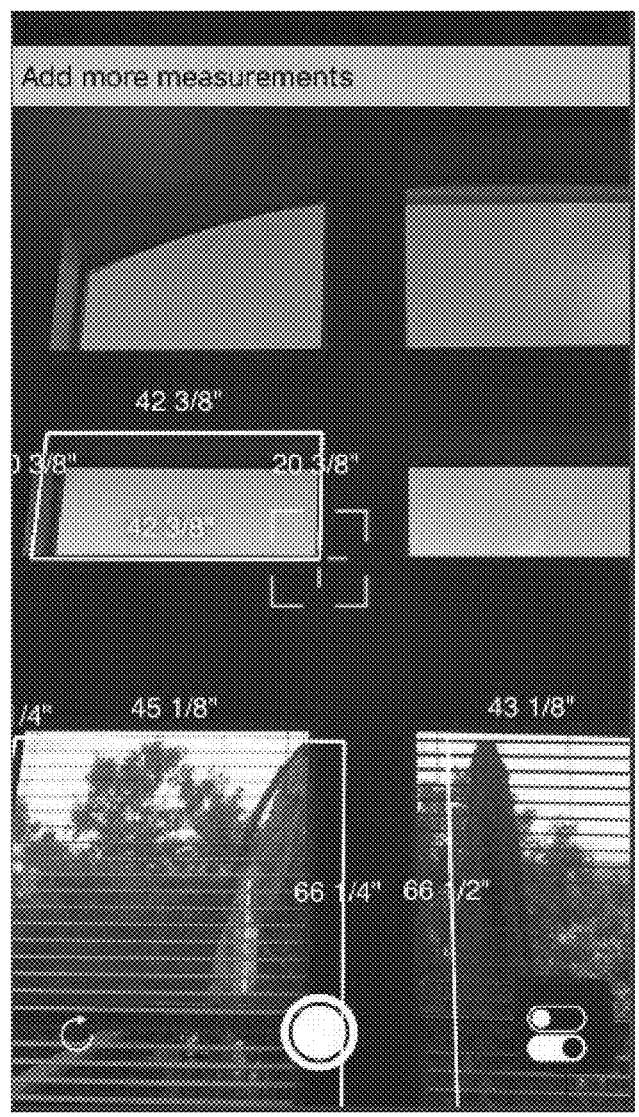
Figure 25:
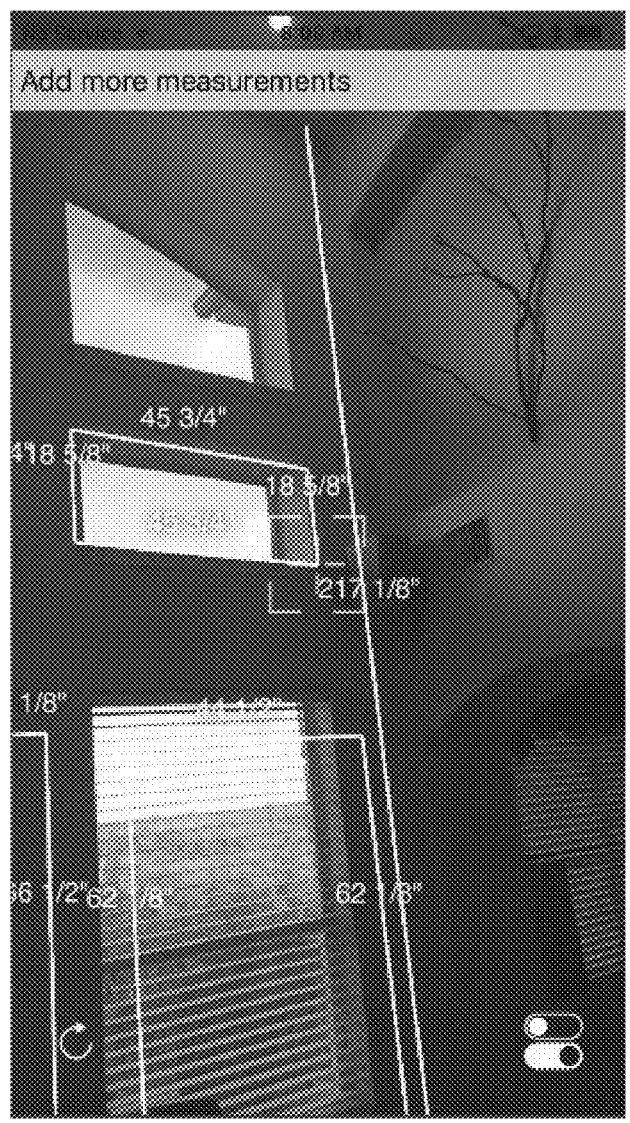

The floorplan is extended vertically to create infinite vertical planes representing walls. Next, the user employs the augmented reality (AR) interface of the application to measure floor-to-ceiling height. The user interacts with the interface via voice commands to mark an intersection with the floor plane (see FIG. 20) and extend a ray up the wall in AR to the intersection with the ceiling (see FIG. 21), thus measuring floor-to-ceiling height. In a non-limiting example of ways the user interacts with the AR interface to measure the floor-to-ceiling height, the user hovers over a linear segment of the floorplan with the active reticle, and clicks on a touchscreen button on the electronic device, thereby activating the segment. Next, the user lifts the phone from a downward position (e.g., pointing towards the ground) in an upward motion (e.g., towards the vertical plane), thereby extending vertical planes in an upward direction from all linear segments of the floorplan. The application then truncates the virtual vertical walls to reflect the actual ceiling height in the space.

Finally, the user employs the augmented reality (AR) interface of the application to indicate windows, interacting with the interface via voice commands to start and end measurements, diagonally from corner to corner, on the vertical planes (e.g., virtual walls) of the space. The user indicates the placement of several windows on the wall of the living room space (see FIGS. 22-25). Upon indicating the placement of each window on the wall within the space, the AR interface calculates and displays the dimensions of each window by reference to the fixed coordinate system. The application then converts the floorplan and the floor-to-ceiling height measurements into a format uniquely designed to upload the data generated during the AR session to a cloud computing platform for further processing. One of the formats useful for this purpose is a JSON format as disclosed herein.

Example 3—Generating a Floorplan and a Three-Dimensional (3D) Model of a Closet

A user wants to create a digital representation of their closet to plan for a shelving project. The user initializes an AR application on their smartphone and employs an AR interface of the application to view the space of the closet through the camera of their smartphone. The AR application utilizes a resource of the smartphone to identify the position and orientation of the smartphone in reference to a fixed coordinate system as well as the orientation of the ground plane in the space in reference to the fixed coordinate system.

Figure 27:

The user does not have to place rulers or fiducial markers into the space, but as the user scans the space, viewing it through the camera of their smartphone via the AR interface, the application automatically detects and marks the corners of the floor. The application generates an AR overlay, in real-time, indicating a floorplan of the closet with the length of each linear measurement displayed in the AR interface. The application also automatically detects and marks the corners of the ceiling. The application then generates an augmented reality (AR) overlay, in real-time, indicating the floor-to-ceiling height with the length of each linear measurement displayed in the AR interface (see FIG. 27).

Figure 26:
FIG. 26 exemplifies a user interface; in this case, an AR interface for making measurements of a space (e.g., a closet), wherein a user is measuring a doorway to the space; the view is taken outside of the closet FIG. 27 exemplifies a user interface; in this case, an AR interface for making measurements of a space, wherein a user is measuring the floor-to-ceiling height of the space.
Figure 28:
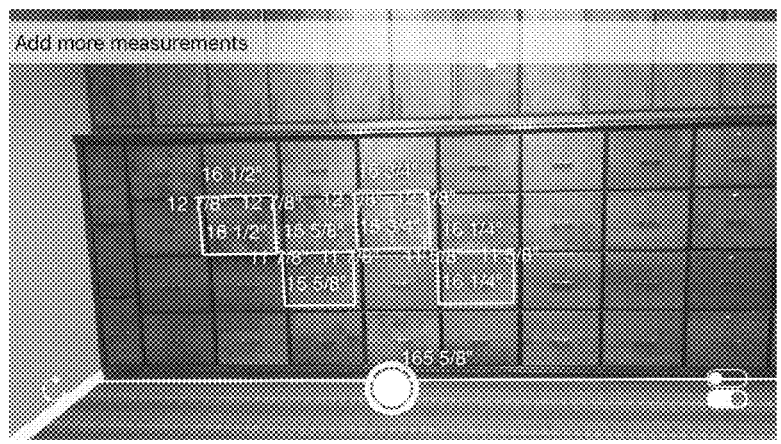
FIG. 28 exemplifies a user interface; in this case, an AR interface for making measurements of features within a space and labeling the features, wherein a user is making measurements of storage drawers in the space.

Finally, the application automatically detects the corners of features and objects on the vertical planes of the closet space. The application detects the corners of several storage drawers on a wall of the closet space (see FIG. 28). Upon indicating the placement of each drawer on the wall within the space, the AR interface calculates and displays the dimensions of each drawer by reference to the fixed coordinate system. The application also detects the corners of a door to the closet space on a wall (see FIG. 26) and calculates its dimensions as well. The user decides not to use the optional voice commands offered by the application to tag the objects and features identified within the space with an annotation because the closet space is simple and does not have many features. Optionally, the user exports the data and 3D model generated during the AR session into a format that is uniquely designed to upload the data generated during the AR session to a cloud computing platform for further processing.

Example 4—Exporting a Floorplan and a Three-Dimensional (3D) Model to a Cloud Portal A user wants to view a floorplan and 3D model of a space for purposes of completing figuring out how much paint is needed to paint a room in a house. The AR application generates a floorplan and a 3D model of a room. Next, the AR application assembles data generated from the AR session comprising the floorplan, 3D model, measurement data, measurement annotations, user labels, images, videos and/or frames of a video. The AR application packages the data in a JSON format that is compatible with a cloud portal.

The user is prompted to create a user account profile for the cloud portal Once the user account profile is complete, the user is prompted to describe the project (e.g., "room") the user wishes to view in the cloud portal. Next, the data is transmitted by the AR application to the cloud back-end (e.g., cloud portal) via a custom API. The cloud portal, configured to be the API EndPoint, receives the data. The cloud portal provides the user with a user interface configured to allow the user to view all projects associated with the user account. The user selects the project labeled "room." The cloud portal provides the user several modules, comprising a project summary, location of project, three-dimensional (3D) model viewer, and photos viewer.

The project summary provides the user with the total number of rooms, walls, doors, openings, windows, objects, floor area, floor perimeter, perimeter of the floor area less the area of the openings, wall area, wall area less the area of the openings, of the space. The location of the project module comprises the name of the user, location of the project, and pinpoint location of the project using a map. The 3D model viewer module provides the user with an interactive 3D model of the room. The user activates planes, objects, and/or openings in the 3D using touch gesture, such as a keyboard, mouse, or touchscreen gesture. Once a plane, object, and/or opening is activated, the cloud portal provides measurement information generated during the augmented reality (AR) session comprising, area, perimeter, length, width, height, and depth measurements. The 3D model also provides the floor perimeter, perimeter of the floor area less the area of the openings, wall area, wall area less the area of the openings, of the space. A user can use the wall area less the area of openings to calculate the amount of pain needed to cover the space. The photos module provides the user with the images, videos, and frames of a video taken during the session in a photos module. The 3D model viewer optionally comprises icons representing images, videos, and/or frames of a video taken by the user during the AR session that are viewable in the photos module.

Example 5—Improved Accuracy of Measurements

Figure 30:
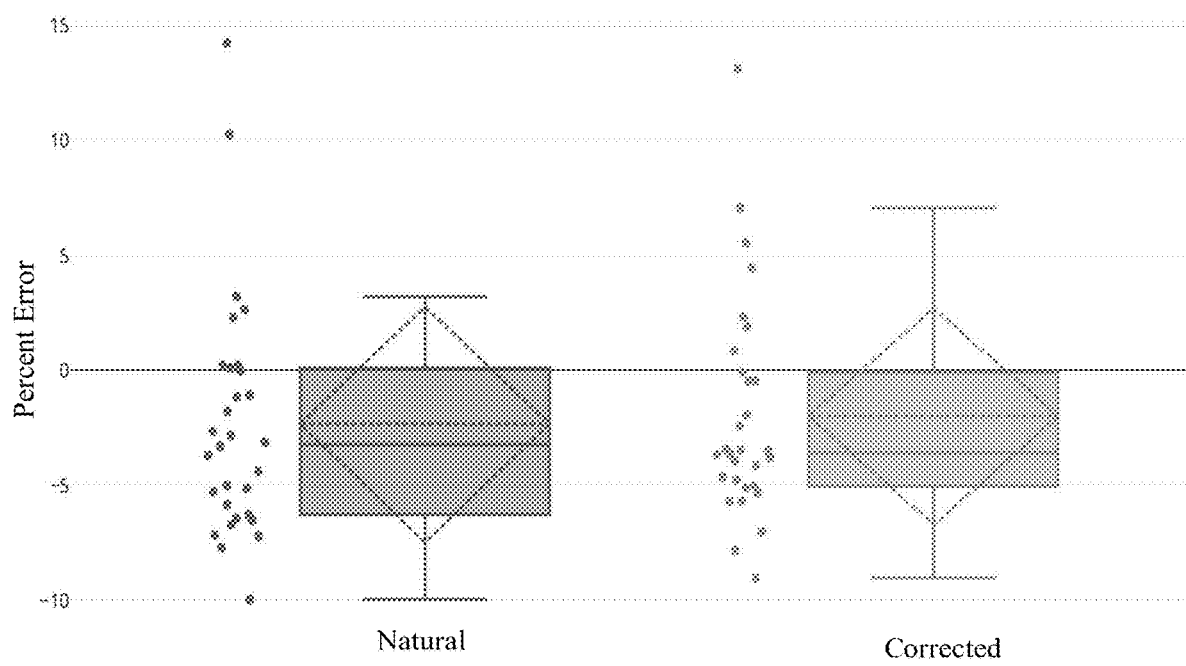
FIG. 30. exemplifies that utilization of the UX construct in the AR application disclosed herein enabling the user to move positions of corners and segments in a floor space yields a >1% improved accuracy as compared to using the AR application without the UX construct.

The accuracy of the measurements generated for a space using the AR application without the user experience (UX) construct enabling the user to move positions of corners and segments in a floorplan, as compared to the AR application with this UX, was calculated. A first 3D model of a space with exact known dimensions was generated using the AR application disclosed herein without the UX construct. Next, a second 3D model of the space was generated with the AR application using the UX construct. The measurement data from the first 3D model and the measurement data from the second 3D model were compared to the exact known dimensions of the space. FIG. 30 shows a reduction in error, or "drift" error, using this UX construct of over 1% as compared to using the AR application without the UX construct. Drift error occurs when a user indicates a position of a corner or intersection point of two planes in a space, while standing in a first position, which becomes less accurate as the user moves towards the position or intersection (appearing as though it is drifting away from the intended position or intersection). The UX construct of the present embodiment enables the user to move the position or intersection point, or an entire segment in a floorplan, in real-time to a position that more accurately reflects the location in the space.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. An electronic device for generating a three-dimensional (3D) model of a space, the electronic device comprising:
   a) a camera;
   b) a screen; and
   c) an augmented reality (AR) application configured to perform at least the following:
      i. receive a position and orientation of the electronic device and a ground plane in reference to a fixed coordinate system;
      ii. receive photos of physical corners of a physical floor in reference to the fixed coordinate system;
      iii. detect the physical corners of the physical floor in the photos of the physical corners of the physical floor and assemble the detected corners into a floorplan of the space with a virtual floor;
      iv. generate virtual quasi-infinite vertical planes extending from each measured line in a set of measured lines between the detected corners representing initial virtual walls of the space;
      v. receive photos of intersection points between a physical ceiling and the initial virtual walls (ceiling intersections);
      vi. detect the ceiling intersections in the photos of the intersection points between the physical ceiling and the initial virtual walls and truncate the initial virtual walls to reflect a height of the physical ceiling in the space and generate a virtual ceiling;
      vii. receive photos of wall openings;
      viii. detect the wall openings in the photos of the wall openings;
      ix. detect damage to the space in the photos of the physical corners of the physical floor, the photos of the intersection points between the physical ceiling and the initial virtual walls, or the wall openings; and
      x. assemble the floorplan, the truncated virtual walls, the virtual ceiling, and the wall openings into the 3D model of the space in world coordinates, wherein the 3D model comprises a representation of the damage.

2. The electronic device of claim 1, wherein the space is an interior space.

3. The electronic device of claim 1, wherein the space is an exterior space.

4. The electronic device of claim 1, wherein the AR application receives inputs from a user via touchscreen gestures or voice commands.

5. The electronic device of claim 1, wherein the wall openings comprise a door, a window, a duct, a vent, an electrical outlet, or any combination thereof.

6. The electronic device of claim 1, wherein the AR application is further configured to provide an interface allowing a user to move or adjust positions of one or more of: the detected corners of the virtual floor, intersection points between the virtual ceiling and the truncated virtual walls, segments of the truncated virtual walls, the wall openings, and the representation of the damage.

7. The electronic device of claim 1, wherein the AR application is further configured to generate a materials list for a project involving the space.

8. A method of generating a three-dimensional (3D) model of a space using an augmented reality (AR) application running on an electronic device comprising a camera and a screen, the method comprising:
   a) receiving a position and orientation of the electronic device and a ground plane in reference to a fixed coordinate system;
   b) receiving photos of physical corners of a physical floor in reference to the fixed coordinate system;
   c) detecting the physical corners of the physical floor in the photos of the physical corners of the physical floor and assemble the detected corners into a floorplan of the space with a virtual floor;
   d) generating virtual quasi-infinite vertical planes extending from each measured line in a set of measured lines between the detected corners representing initial virtual walls of the space;
   e) receiving photos of intersection points between a physical ceiling and the initial virtual walls (ceiling intersections);
   f) detecting the ceiling intersections in the photos of the intersection points between the physical ceiling and the initial virtual walls and truncate the initial virtual walls to reflect a height of the physical ceiling in the space and generate a virtual ceiling;
   g) receiving photos of wall openings;
   h) detecting the wall openings in the photos of the wall openings;
   i) detecting damage to the space in the photos of the physical corners of the physical floor, the photos of the intersection points between the physical ceiling and the initial virtual walls, or the wall openings; and
   j) assembling the floorplan, the truncated virtual walls, the virtual ceiling, and the wall openings into the 3D model of the space in world coordinates, wherein the 3D model comprises a representation of the damage.

9. The method of claim 8, wherein the space is an interior space.

10. The method of claim 8, wherein the space is an exterior space.

11. The method of claim 8, wherein the AR application receives inputs from a user via touchscreen gestures or voice commands.

12. The method of claim 8, wherein the wall openings comprise a door, a window, a duct, a vent, an electrical outlet, or any combination thereof.

13. The method of claim 8, further comprising providing an interface allowing a user to move or adjust positions of one or more of: the detected corners of the virtual floor, intersection points between the virtual ceiling and the truncated virtual walls, segments of the truncated virtual walls, the wall openings, and the representation of the damage.

14. The method of claim 8, further comprising generating a materials list for a project involving the space.

15. A non-transitory computer-readable storage medium storing instructions executable by at least one processor of a mobile electronic device to generate a three-dimensional (3D) model of a space by performing at least the following:
   a) receiving a position and orientation of the mobile electronic device and a ground plane in reference to a fixed coordinate system;
   b) receiving photos of physical corners of a physical floor in reference to the fixed coordinate system;
   c) detecting the physical corners of the physical floor in the photos of the physical corners of the physical floor and assemble the detected corners into a floorplan of the space with a virtual floor;
   d) generating virtual quasi-infinite vertical planes extending from each measured line in a set of measured lines between the detected corners representing initial virtual walls of the space;
   e) receiving photos of intersection points between a physical ceiling and the initial virtual walls (ceiling intersections);
   f) detecting the ceiling intersections in the photos of the intersection points between the physical ceiling and the initial virtual walls and truncate the initial virtual walls to reflect a height of the physical ceiling in the space and generate a virtual ceiling;
   g) receiving photos of wall openings;
   h) detecting the wall openings in the photos of the wall openings;
   i) detecting damage to the space in the photos of the physical corners of the physical floor, the photos of the intersection points between the physical ceiling and the initial virtual walls, or the wall openings; and
   j) assembling the floorplan, the truncated virtual walls, the virtual ceiling, and the wall openings into the 3D model of the space in world coordinates, wherein the 3D model comprises a representation of the damage.

16. The non-transitory computer-readable storage medium of claim 15, wherein the space is an interior space.

17. The non-transitory computer-readable storage medium of claim 15, wherein the space is an exterior space.

18. The non-transitory computer-readable storage medium of claim 15, wherein the wall openings comprise a door, a window, a duct, a vent, an electrical outlet, or any combination thereof.

19. The non-transitory computer-readable storage medium of claim 15, wherein the instructions are executable by the at least one processor of the mobile electronic device to provide an interface allowing a user to move or adjust positions of one or more of: the detected corners of the virtual floor, intersection points between the virtual ceiling and the truncated virtual walls, segments of the truncated virtual walls, the wall openings, and the representation of the damage.

20. The non-transitory computer-readable storage medium of claim 15, wherein the instructions are executable by the at least one processor of the mobile electronic device to generate a materials list for a project involving the space.

\* \* \* \* \*